(12) United States Patent
Sun et al.

(10) Patent No.: US 11,250,593 B2
(45) Date of Patent: Feb. 15, 2022

(54) SYSTEM AND METHOD FOR DETECTING AND CORRECTING DEFECTIVE IMAGE OUTPUT FROM RADIATION-DAMAGED VIDEO CAMERAS

(71) Applicant: Varian Medical Systems, Inc., Palo Alto, CA (US)

(72) Inventors: Paul Pu Sun, Fremont, CA (US); Eric Michael Stimmann, San Jose, CA (US)

(73) Assignee: Varian Medical Systems, Inc, Palo Alto, CA (US)

( * ) Notice: Subject to any disclaimer, the term of this patent is extended or adjusted under 35 U.S.C. 154(b) by 0 days.

(21) Appl. No.: 16/889,772

(22) Filed: Jun. 1, 2020

(65) Prior Publication Data

US 2021/0374999 A1    Dec. 2, 2021

(51) Int. Cl.
*G06T 7/80* (2017.01)
*H04N 17/00* (2006.01)
*G06T 7/00* (2017.01)

(52) U.S. Cl.
CPC .............. *G06T 7/80* (2017.01); *G06T 7/0012* (2013.01); *H04N 17/002* (2013.01); *G06T 2207/30004* (2013.01)

(58) Field of Classification Search
CPC ........ G06T 7/80; G06T 7/0012; H04N 17/002
See application file for complete search history.

(56) References Cited

U.S. PATENT DOCUMENTS

| | | | | |
|---|---|---|---|---|
| 5,410,418 A | * | 4/1995 | Yonezawa | G06K 9/38 358/464 |
| 2007/0076101 A1 | * | 4/2007 | Baer | H04N 5/2257 348/222.1 |
| 2011/0074943 A1 | * | 3/2011 | Modell | H04N 5/217 348/77 |
| 2016/0216381 A1 | * | 7/2016 | Nishihara | G01T 1/2018 |
| 2017/0318244 A1 | * | 11/2017 | Koskinen | H04N 9/045 |
| 2018/0270431 A1 | * | 9/2018 | Taketomi | H04N 5/23293 |
| 2020/0300765 A1 | * | 9/2020 | Kalkbrenner | G02B 21/16 |

* cited by examiner

*Primary Examiner* — Mishawn N. Hunter
(74) *Attorney, Agent, or Firm* — Vista IP Law Group, LLP

(57) ABSTRACT

An apparatus for use with a medical system, the medical system comprising a medical device configured to treat and/or image a patient, includes: an input configured to receive an image from a camera, the camera configured to view at least a part of the patient and/or at least a part of the medical system; a processing unit configured to replace a damaged-pixel value in the image corresponding with a damaged pixel in the camera that is damaged due to radiation resulted from an operation of the medical device; and an output for outputting an improved image having less noise compared to the image received from the camera.

20 Claims, 15 Drawing Sheets

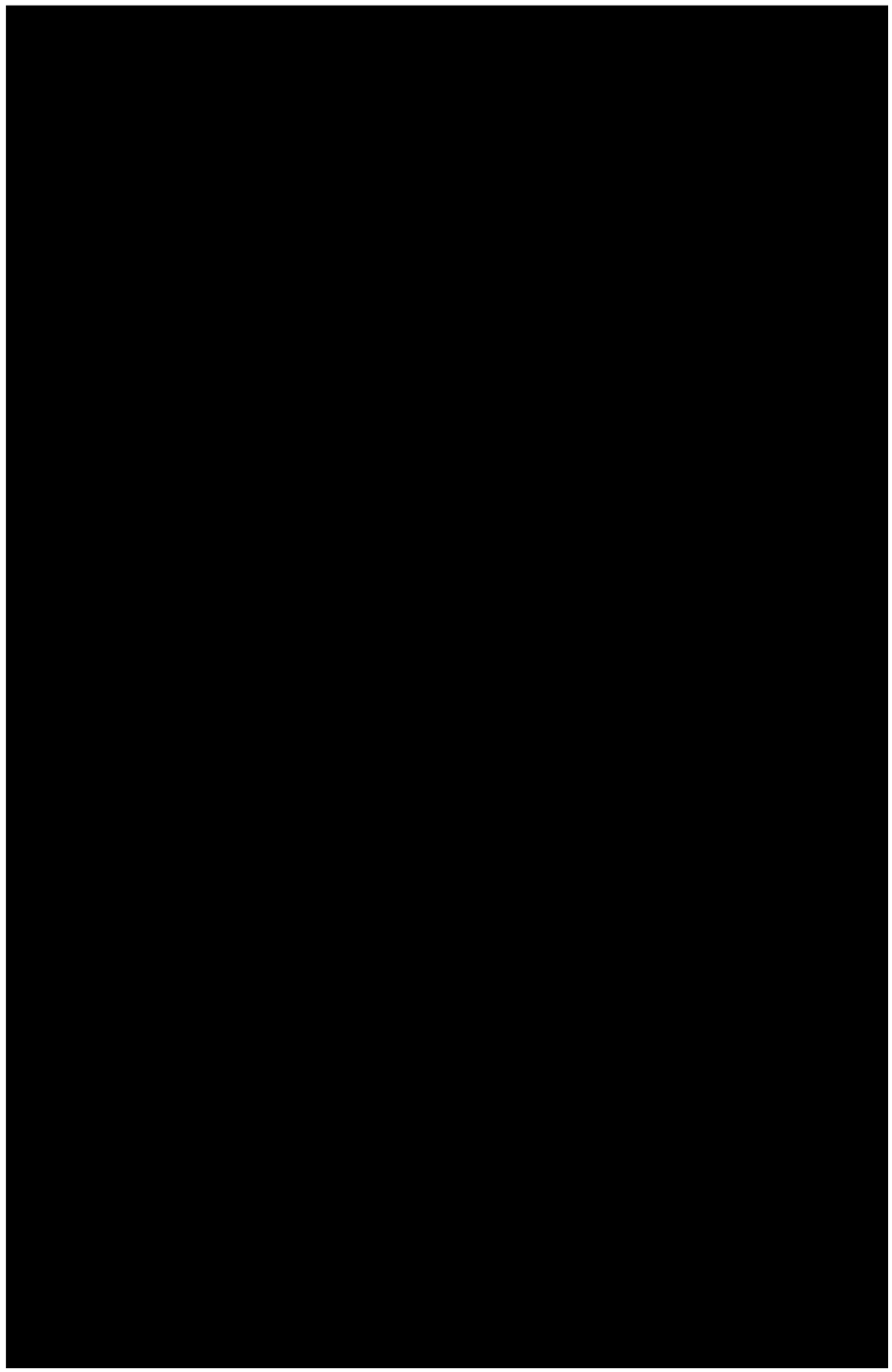

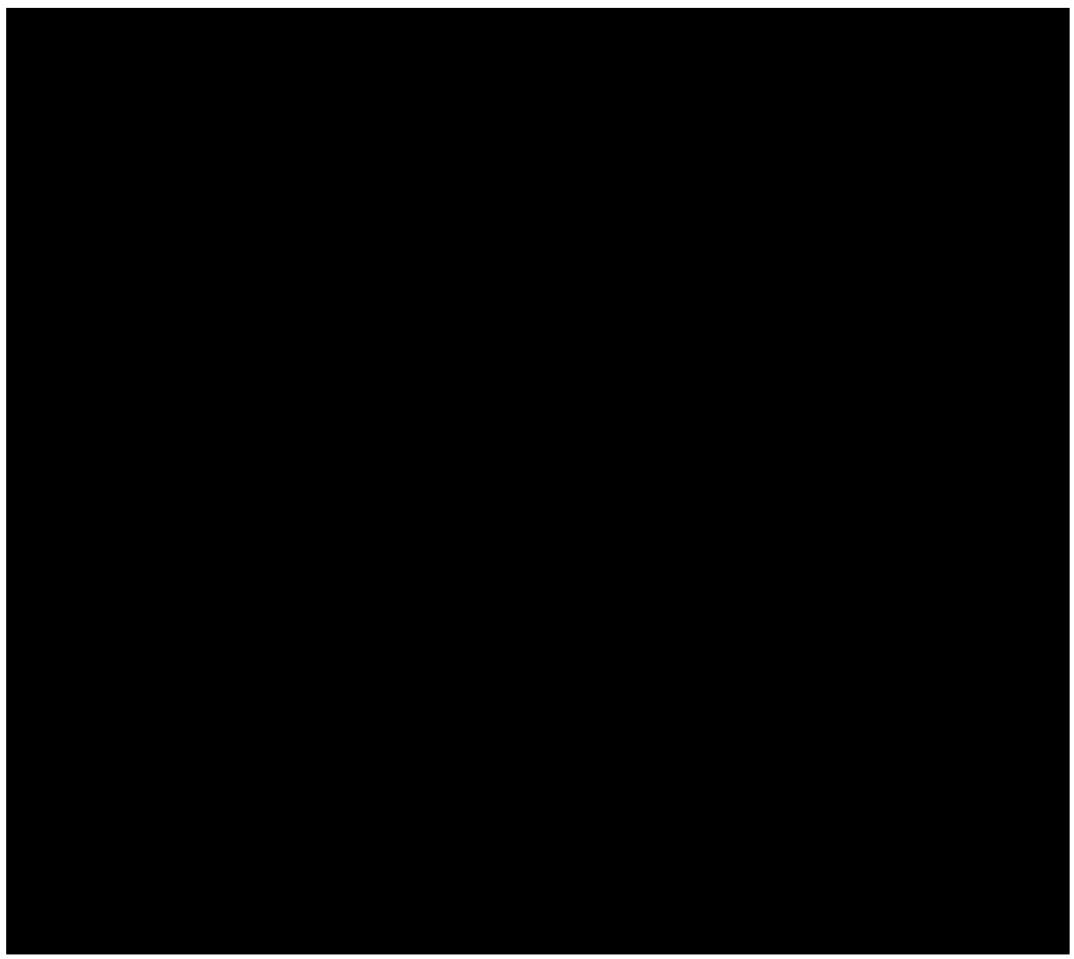

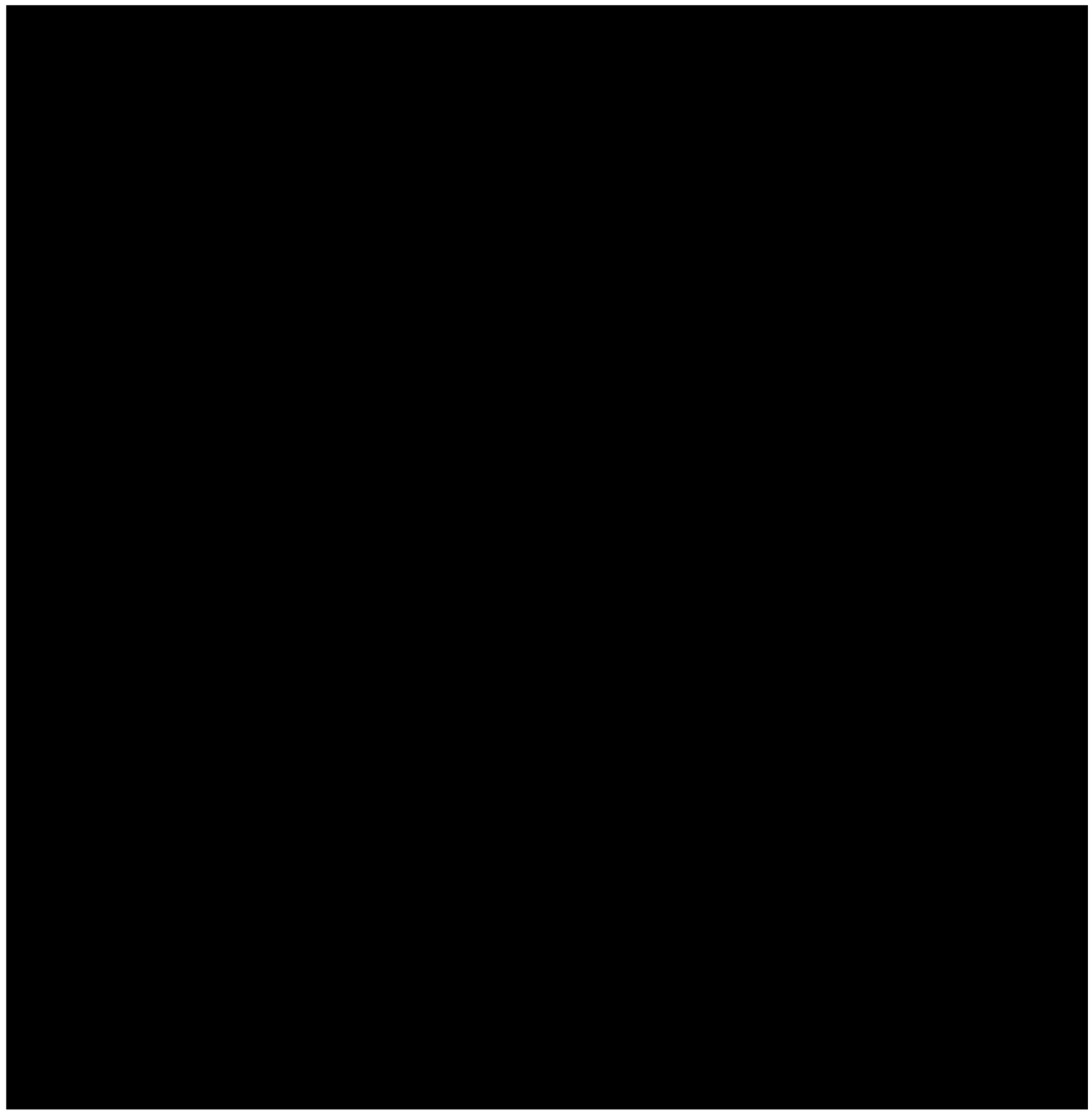

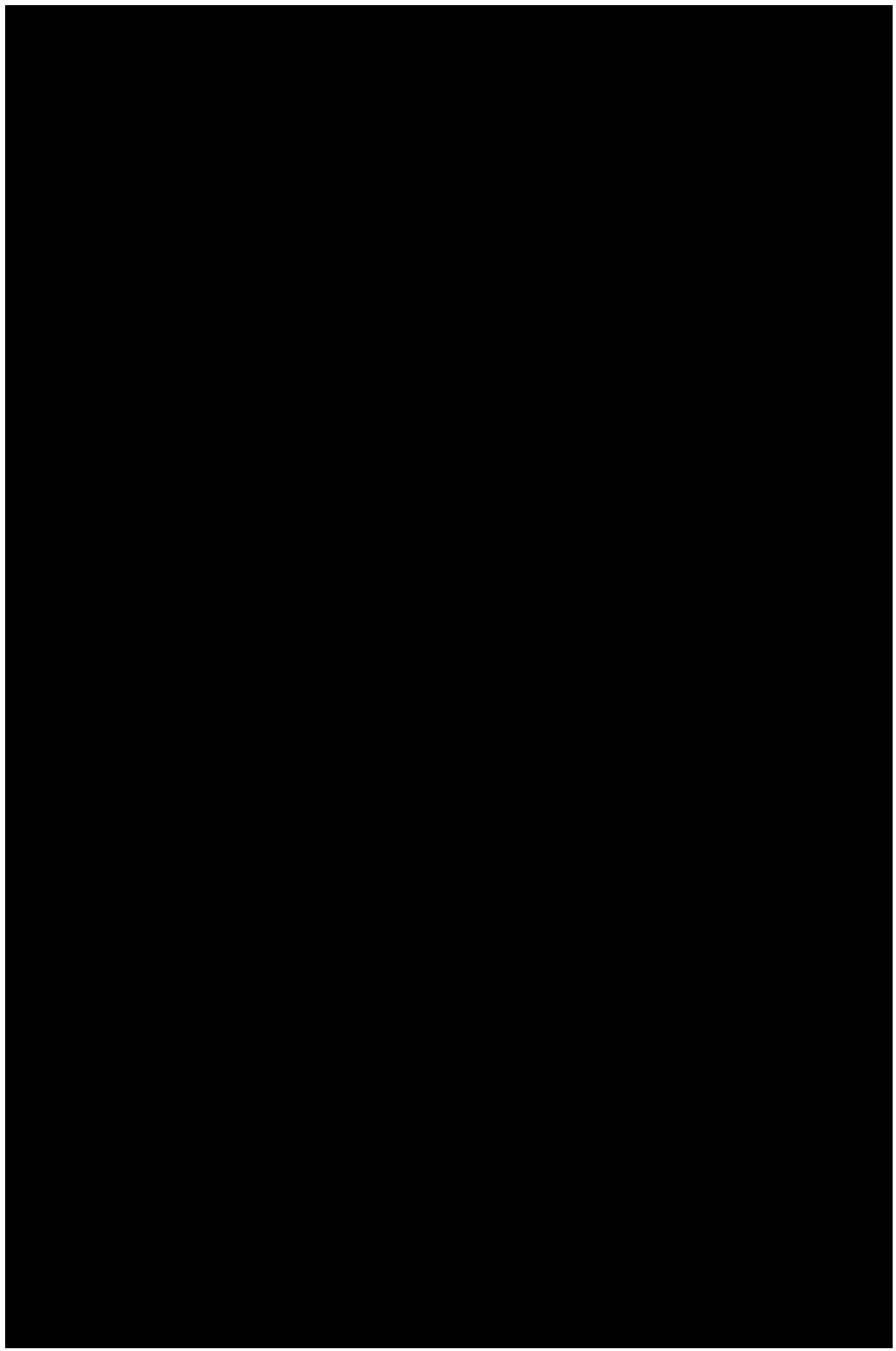

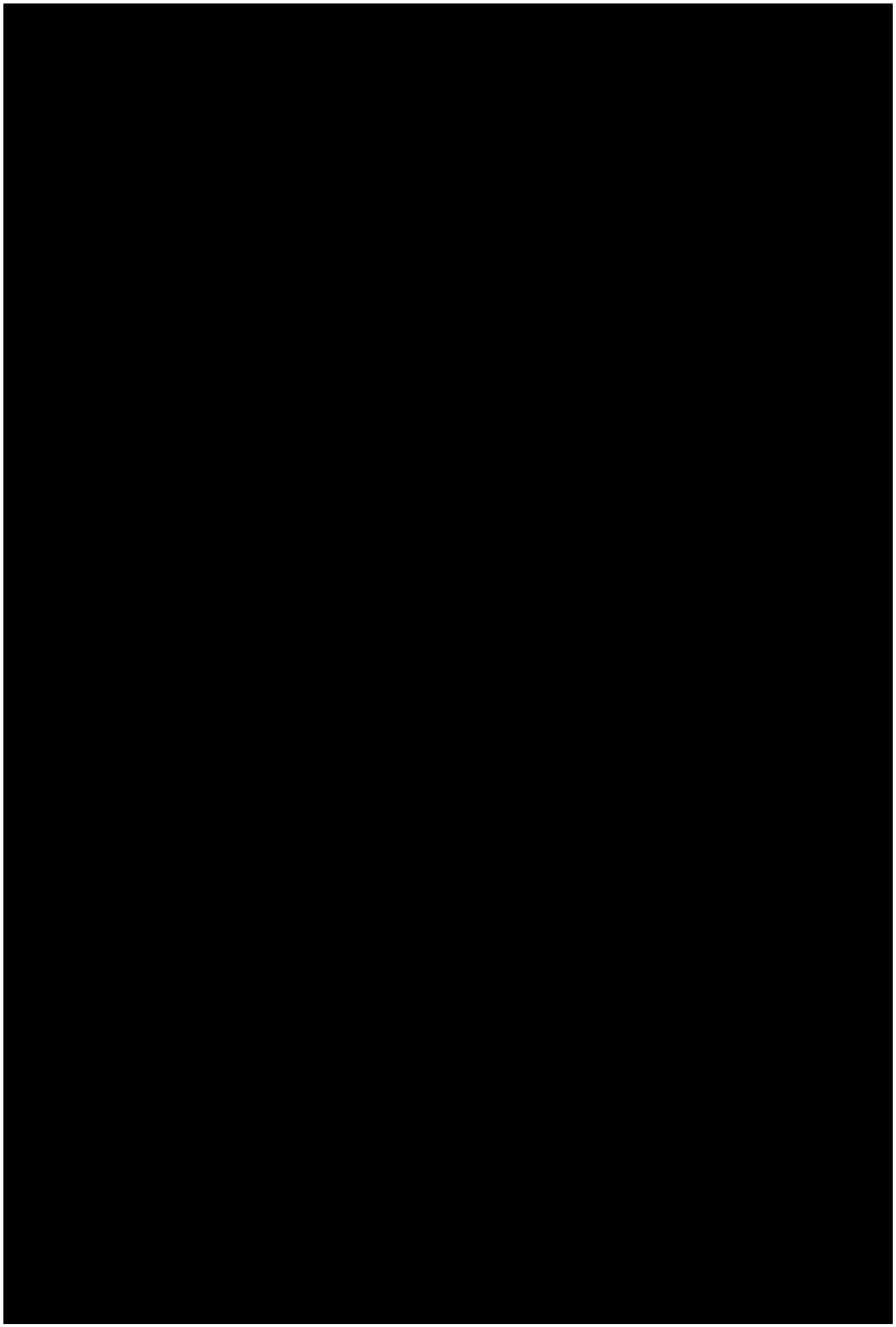

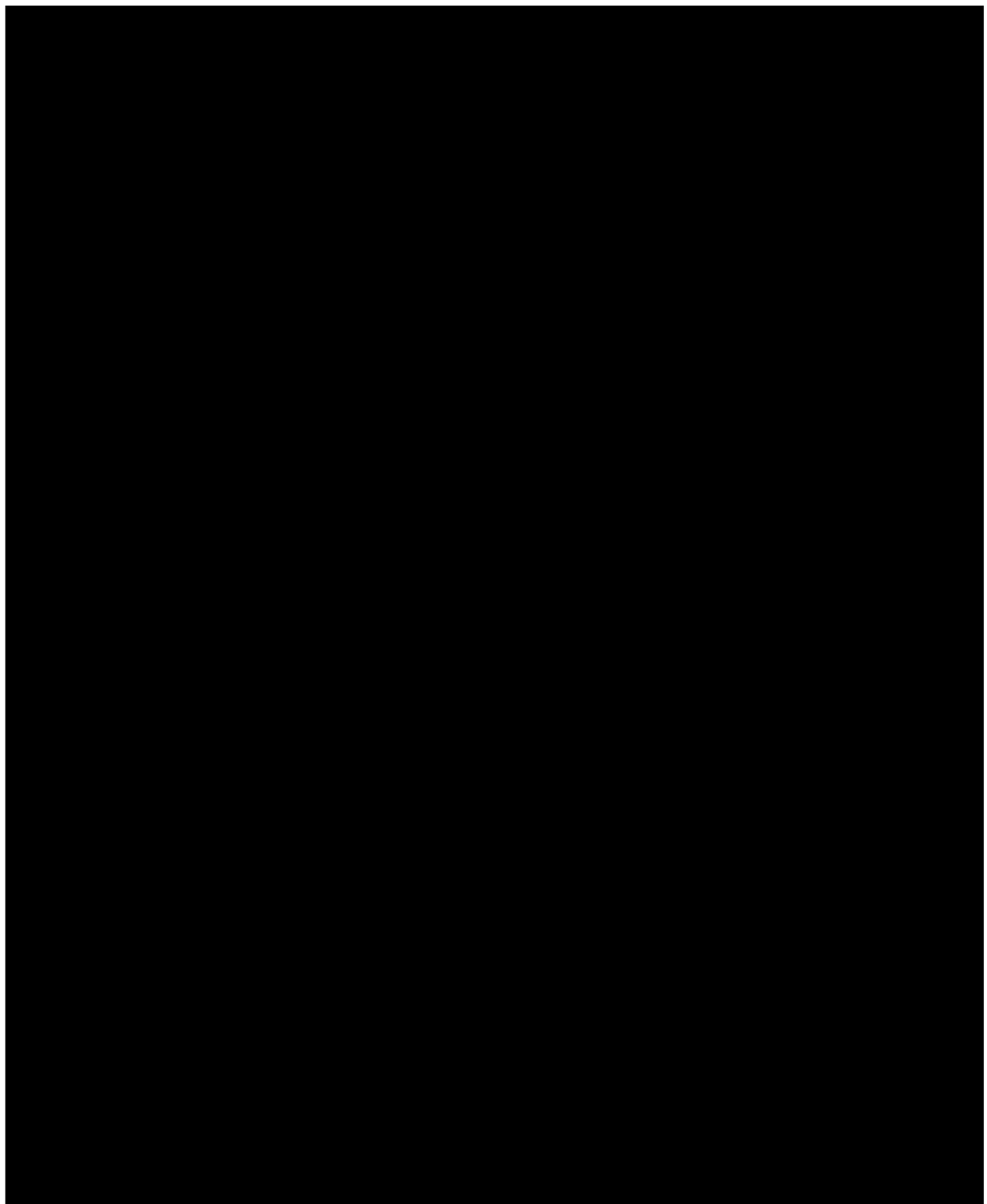

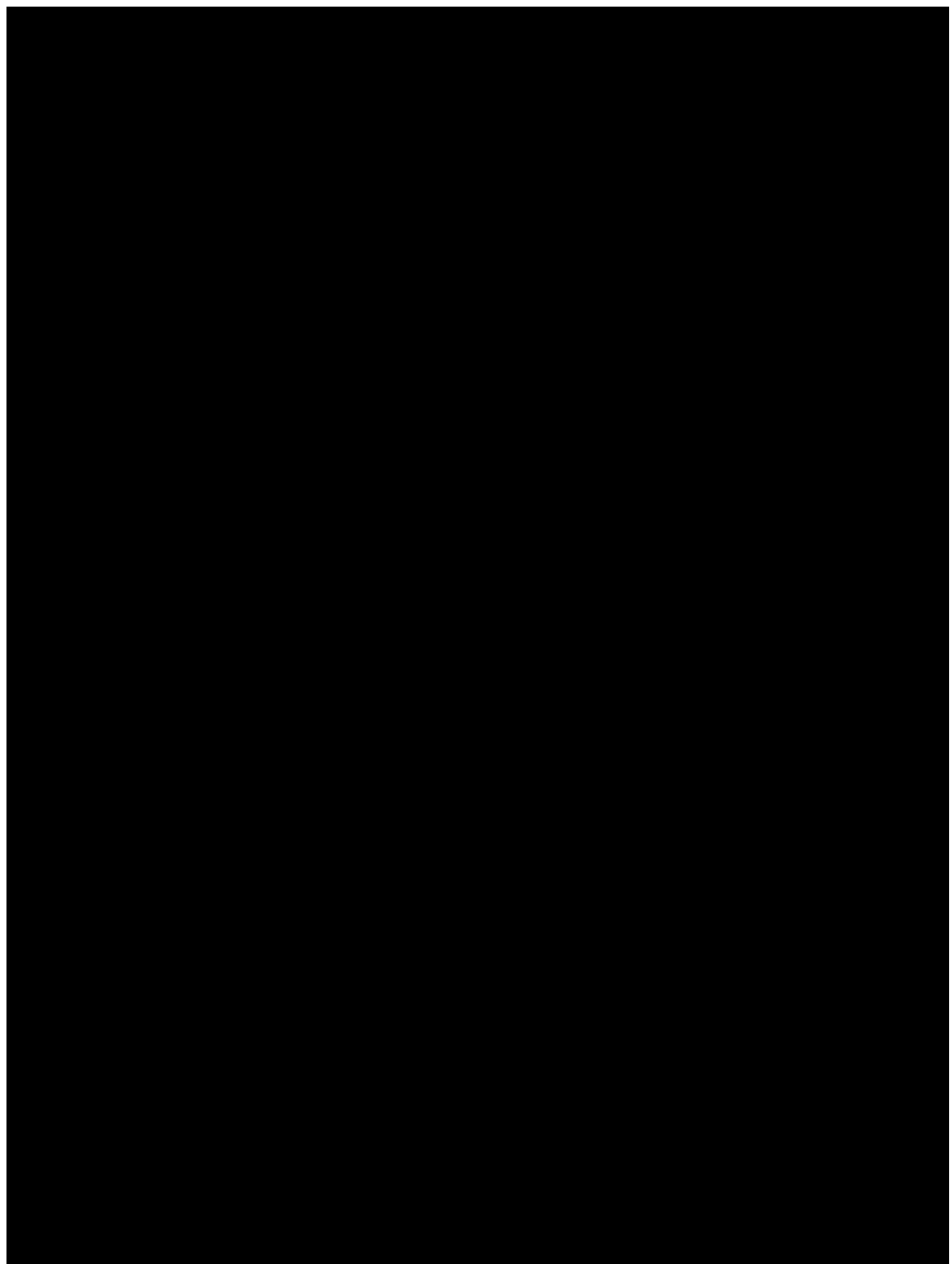

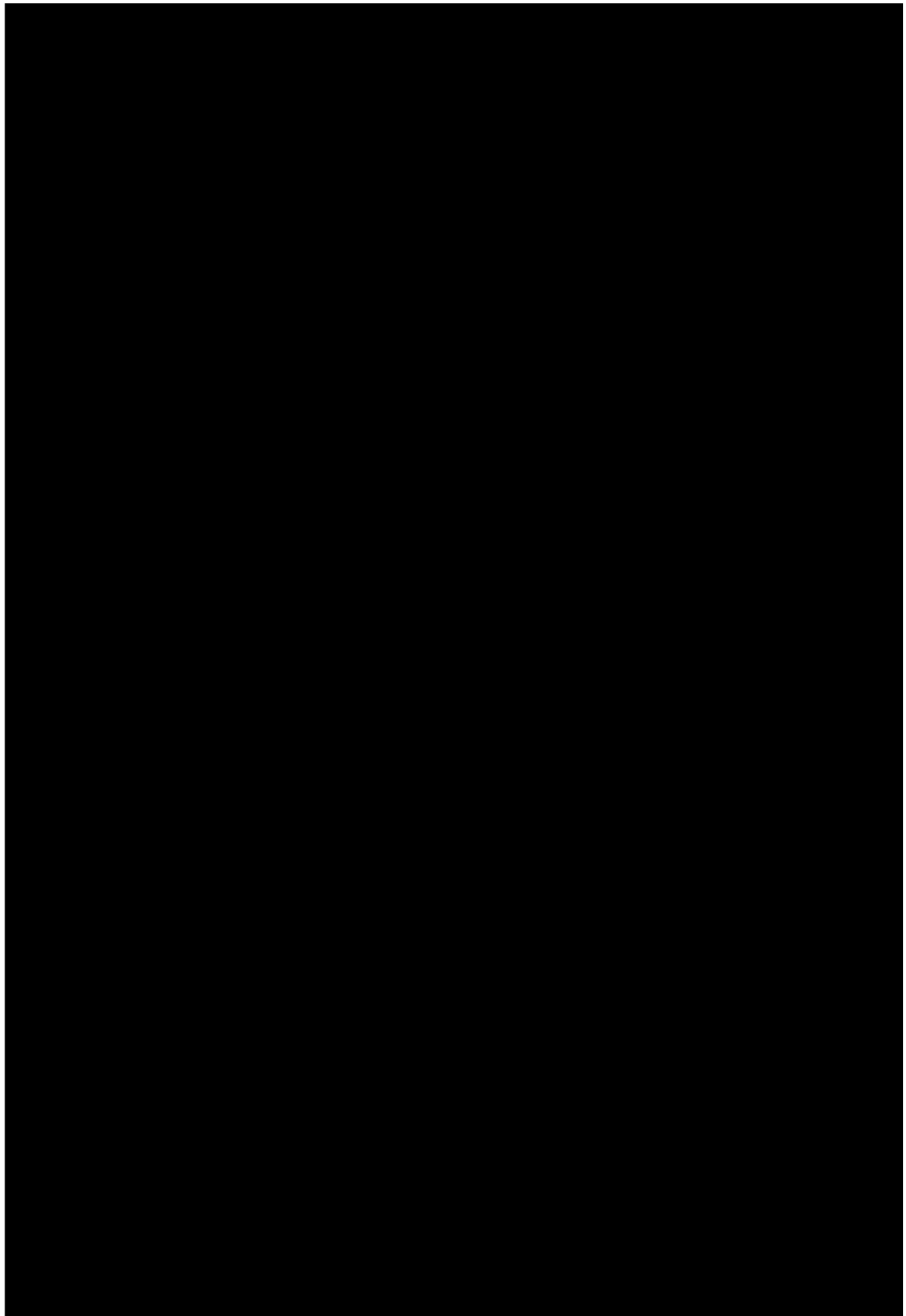

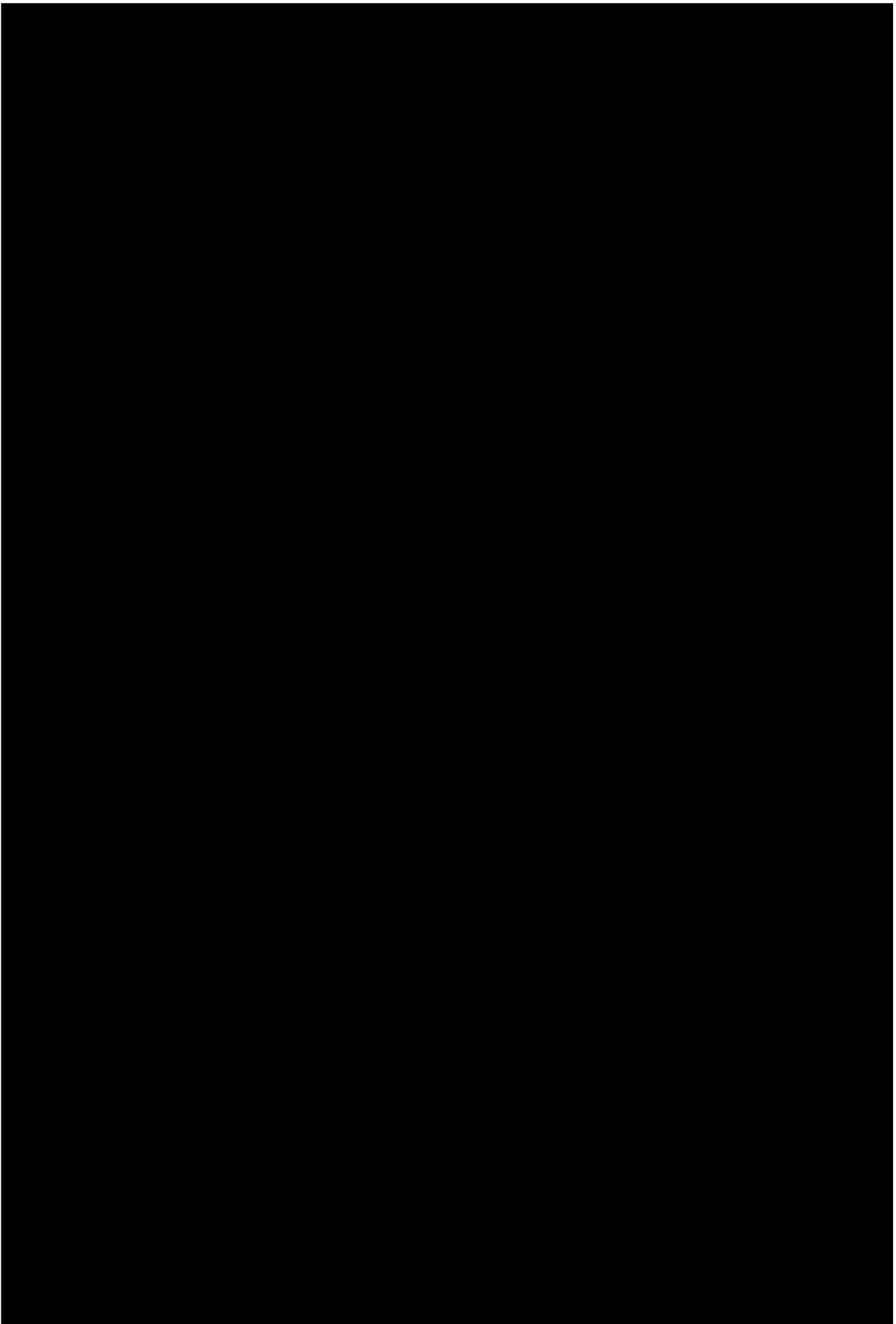

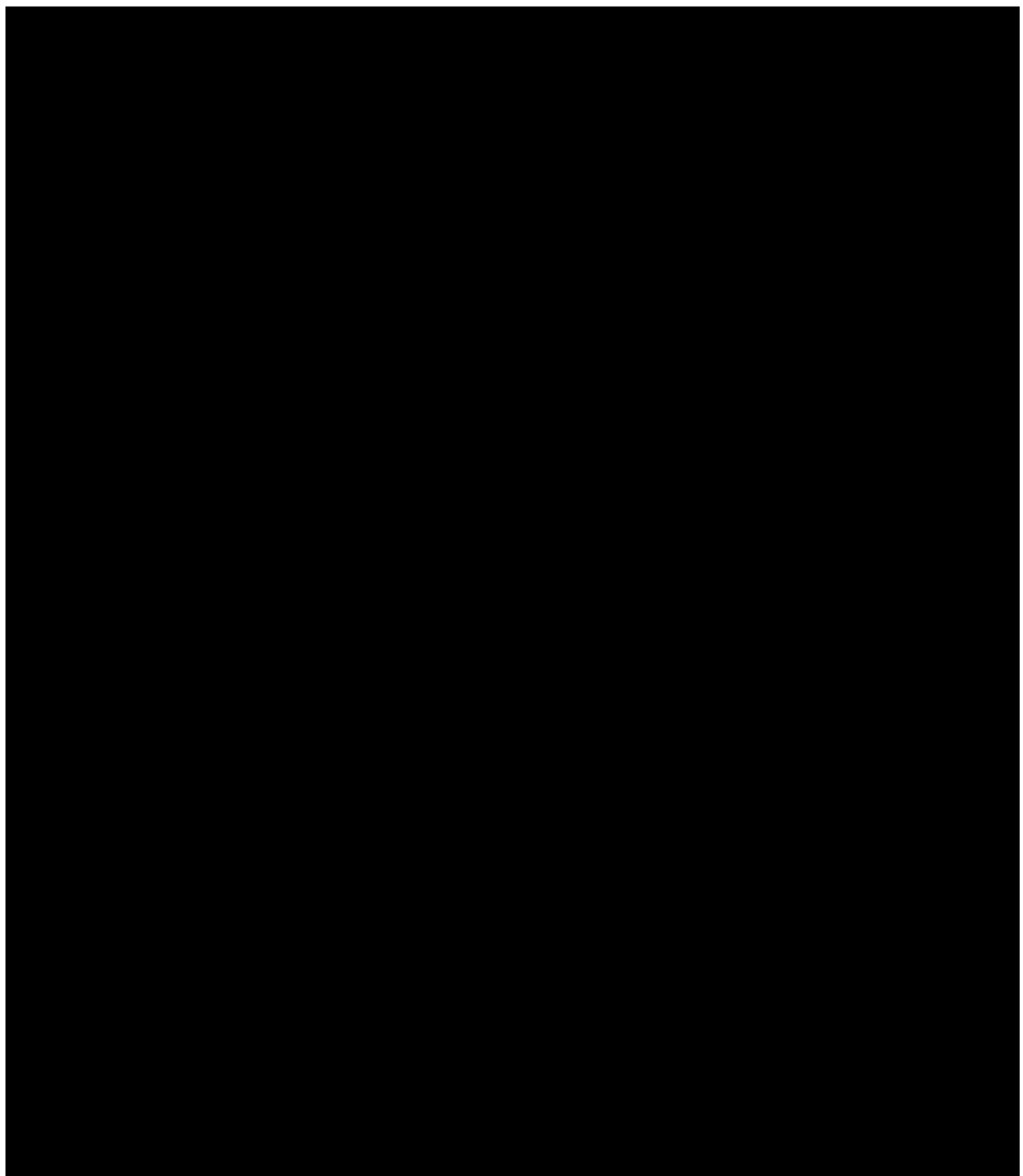

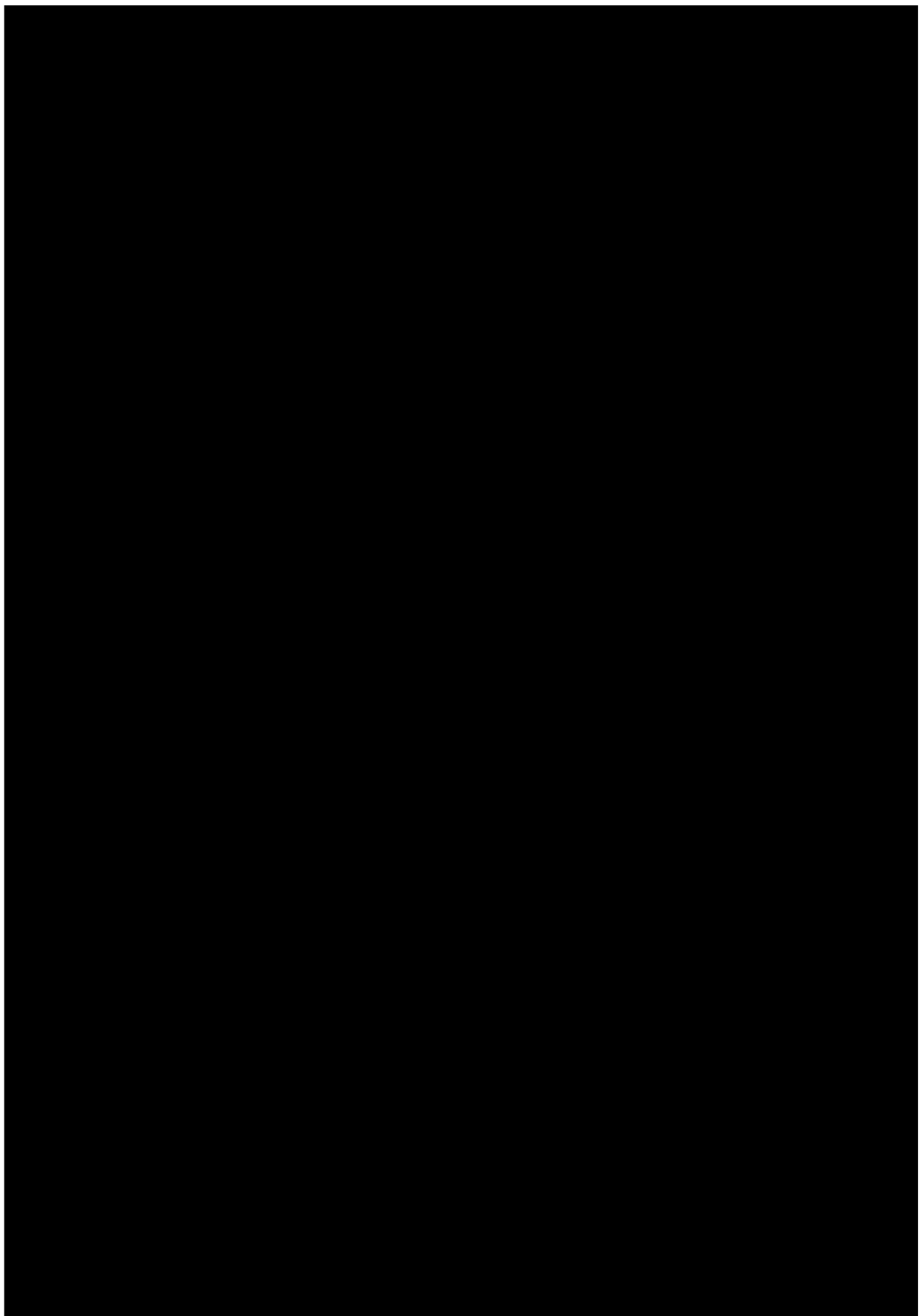

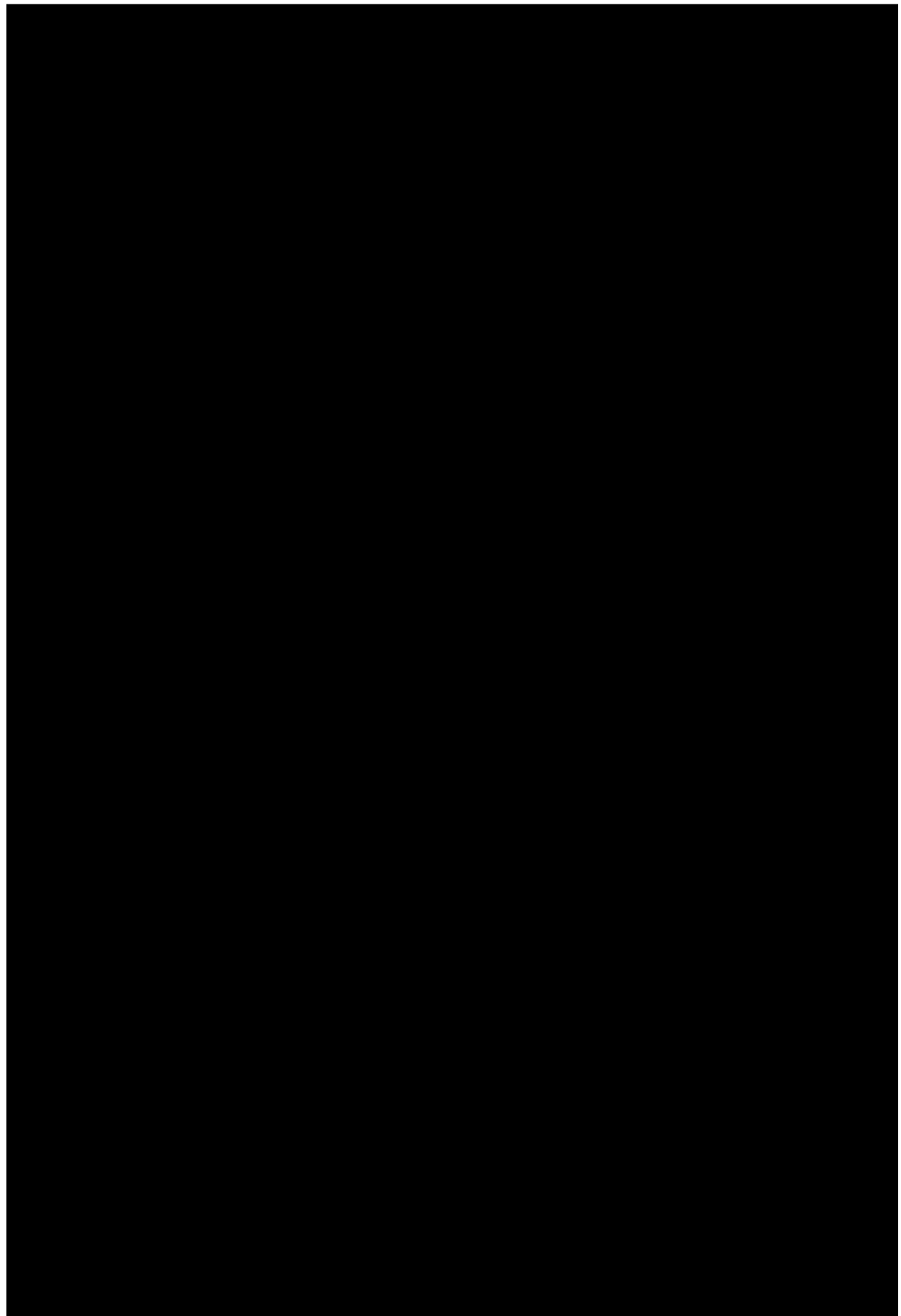

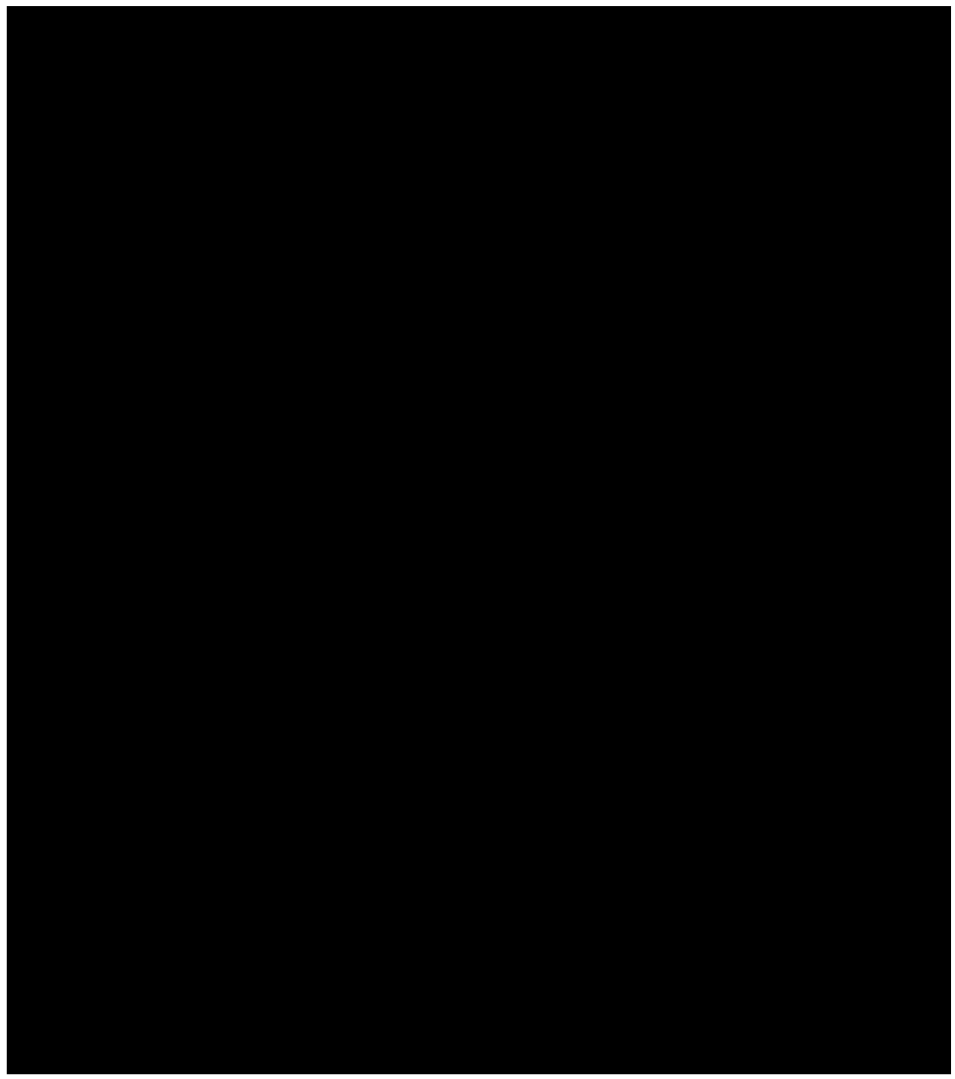

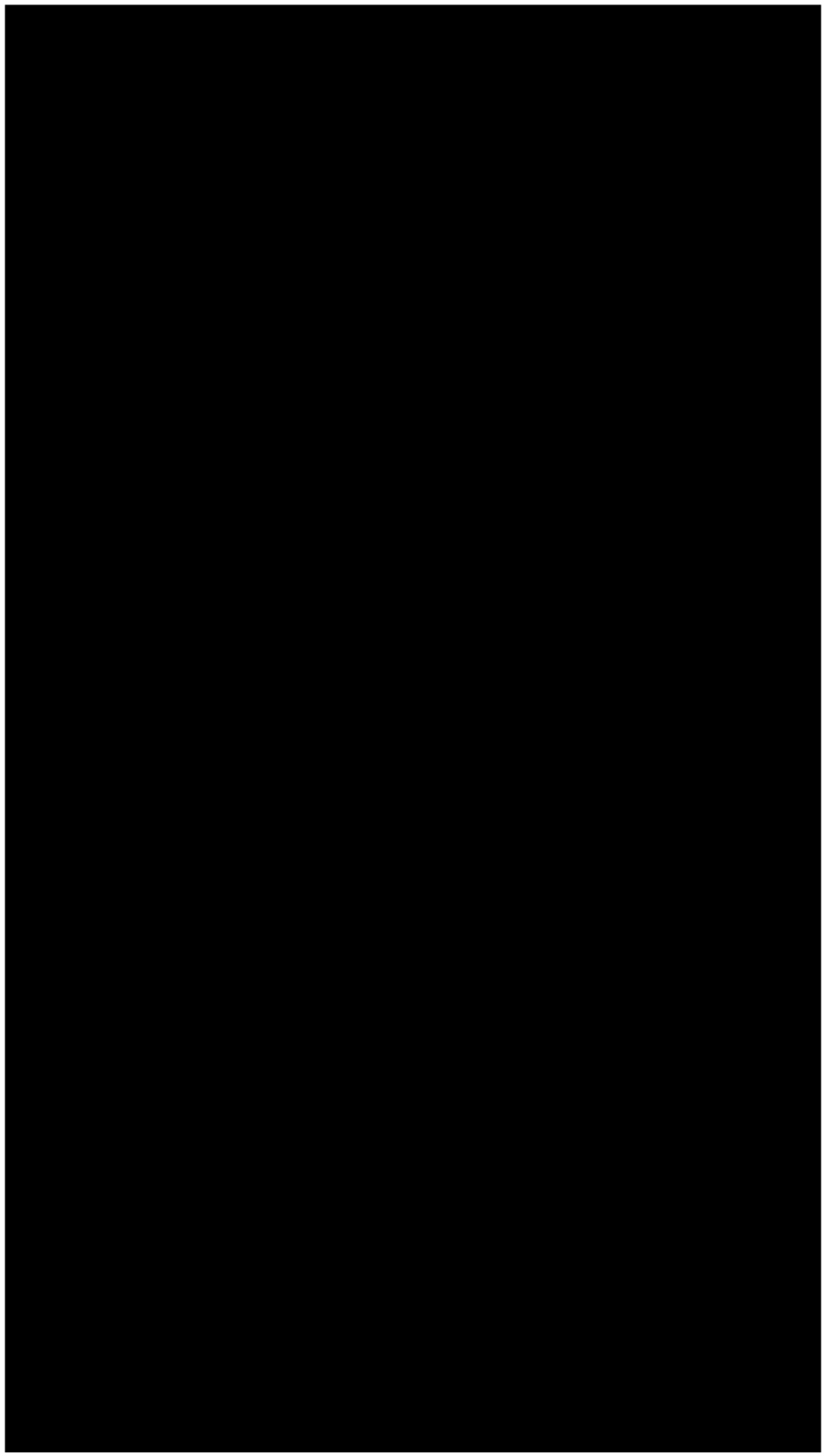

SYSTEM AND METHOD FOR DETECTING AND CORRECTING DEFECTIVE IMAGE OUTPUT FROM RADIATION-DAMAGED VIDEO CAMERAS

FIELD

The field relates to optical devices for use in medical processes, and more particularly, to cameras and methods for use in a medical environment having radiation.

BACKGROUND

Radiation therapy involves medical procedures that selectively expose certain areas of a human body, such as cancerous tumors, to doses of radiation. The purpose of the radiation therapy is to irradiate the targeted biological tissue such that undesirable tissue is destroyed. Radiation has also been-used to obtain image of tissue for diagnostic or treatment purposes.

During delivery of radiation towards a patient, it may be desirable to ensure that a patient remains at a certain position. Also, it may be desirable to know the position of a patient and/or the position of various components of the treatment system during the treatment session in order to prevent collision between the patient and the components.

SUMMARY

In one or more embodiments described herein, an apparatus comprising a camera may be provided to monitor a patient, and/or components of a medical system. The medical system may comprise a medical device, such as a radiation treatment machine, configured to treat the patient. In some embodiments, the camera may not include radiation-hard electronics. In one implementation, the camera may be an off-the-shelf camera. Because the camera does not have radiation-hard electronics, more and more pixels in the camera may be progressively damaged by radiation over time. As a result, the output (e.g., image, video) from the camera may appear noisy. This, in turn, may render the camera undesirable because the camera may fail to capture important events, such as patient movements during treatment. The noisy image is also annoying to user of the camera. To address such problems, one or more embodiments described herein utilize a technique to replace damaged-pixel values with new pixel values. This has the benefits of improving quality of camera output from radiation damaged camera, prolonging a life of the camera in a radiation-rich environment, and ensuring that patient monitoring and/or component monitoring performed using the radiation damaged camera will achieve desirable performance.

An apparatus for use with a medical system, the medical system comprising a medical device configured to treat and/or image a patient, includes: an input configured to receive an image from a camera, the camera configured to view at least a part of the patient and/or at least a part of the medical system; a processing unit configured to replace a damaged-pixel value in the image corresponding with a damaged pixel in the camera that is damaged due to radiation resulted from an operation of the medical device; and an output for outputting an improved image having less noise compared to the image received from the camera.

Optionally, the processing unit is configured to access a medium storing a location of the damaged pixel.

Optionally, the medium comprises a lookup table storing the location of the damaged pixel.

Optionally, the processing unit is configured to replace the damaged-pixel value with a new pixel value.

Optionally, the processing unit is configured to determine the new pixel value by determining a median or an average of neighboring pixel values of respective neighboring pixels around the damaged pixel.

Optionally, the neighboring pixel values comprise four or more neighboring pixel values.

Optionally, the neighboring pixel values comprise eight or more neighbor pixel values.

Optionally, the processing unit is also configured to replace at least eight neighboring pixel values of respective eight neighboring pixels that are surrounding the damaged pixel.

Optionally, the processing unit is configured to identify the damaged pixel in the camera.

Optionally, the processing unit is configured to identify the damaged pixel in the camera by obtaining a calibration image from the camera, and identifying a pixel value in the calibration image having an intensity that is above a threshold.

Optionally, a majority of the calibration image is black or dark.

Optionally, the processing unit is configured to operate the camera to generate the calibration image.

Optionally, the processing unit is configured to operate the camera to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

Optionally, the processing unit is configured to apply a moving window to sequentially process different combinations of X number of pixels in the image; and wherein for each of the combinations of X number of pixels, the processing unit is configured to replace a center-pixel value with a replacement pixel value that is calculated as an average or a median using at least some of the X number of pixels in the window.

Optionally, the window comprises a N-pixel by N-pixel window, wherein N is any odd integer.

Optionally, the processing unit is configured to receive an additional image from an additional camera.

Optionally, the processing unit is configured to replace the damaged-pixel value in the image from the camera with a corresponding pixel value in the additional image from the additional camera.

Optionally, the apparatus further includes the camera and the additional camera, wherein the camera and the additional camera are arranged in a side-by-side configuration with respect to each other.

Optionally, the processing unit or the apparatus is a part of the camera.

A method performed by an apparatus for use with a medical system, the medical system comprising a medical device configured to treat and/or image a patient, includes: receiving, by a processing unit, an image from a camera, wherein the image is generated by the camera while the camera is viewing at least a part of the patient and/or at least a part of the medical system; and replacing, by the processing unit, a damaged-pixel value in the image that corresponds with a damaged pixel in the camera that is damaged due to radiation resulted from an operation of the medical device.

Optionally, the method further includes accessing a medium storing a location of the damaged pixel.

Optionally, the medium comprises a lookup table storing the location of the damaged pixel.

Optionally, the damaged-pixel value is replaced with a new pixel value.

Optionally, the new pixel value comprises a median or an average of neighboring pixel values of respective neighboring pixels around the damaged pixel.

Optionally, the neighboring pixel values comprise four or more neighboring pixel values.

Optionally, the neighboring pixel values comprise eight or more neighbor pixel values.

Optionally, the method further includes replacing at least eight neighboring pixel values of respective eight neighboring pixels that are surrounding the damaged pixel.

Optionally, the method further includes identifying the damaged pixel in the camera.

Optionally, the damaged pixel in the camera is identified by obtaining a calibration image from the camera, and identifying a pixel value in the calibration image having an intensity that is above a threshold.

Optionally, a majority of the calibration image is black or dark.

Optionally, the act of obtaining the calibration image comprises operating the camera to generate the calibration image.

Optionally, the camera is operated to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

Optionally, a moving window is applied to sequentially process different combinations of X number of pixels in the image; and wherein for each of the combinations of X number of pixels, a center-pixel value is replaced with a replacement pixel value that is calculated as an average or a median using at least some of the X number of pixels in the window.

Optionally, the window comprises a N-pixel by N-pixel window, wherein N is any odd integer.

Optionally, the method further includes receiving an additional image from an additional camera.

Optionally, the damaged-pixel value in the image from the camera is replaced with a corresponding pixel value in the additional image from the additional camera.

Optionally, the camera and the additional camera are arranged in a side-by-side configuration with respect to each other.

Optionally, the processing unit or the apparatus is a part of the camera.

Other and further aspects and features will be evident from reading the following detailed description.

BRIEF DESCRIPTION OF THE DRAWINGS

The drawings illustrate the design and utility of embodiments, in which similar elements are referred to by common reference numerals. In order to better appreciate how advantages and objects are obtained, a more particular description of the embodiments will be described with reference to the accompanying drawings. Understanding that these drawings depict only exemplary embodiments and are not therefore to be considered limiting in the scope of the claimed invention.

FIG. 1 illustrates a medical system and a camera for use with the medical system;

FIG. 2 illustrates the camera of FIG. 1, particularly showing the camera being mounted to a patient support;

FIG. 3 illustrates another medical system and cameras for use with the medical system, particularly showing the cameras being mounted to a ceiling;

FIG. 4 illustrates another medical system and cameras for use with the medical system particularly showing the cameras being mounted to component(s) of the medical system;

FIG. 5 illustrates other examples of cameras that may be used with a medical system;

FIG. 6A illustrates an example of an image received from a camera, particularly showing the image having noise due to damaged pixels of a camera;

FIG. 6B illustrates an example of an improved image that is generated using any of the exemplary techniques described herein;

FIG. 7 illustrates an apparatus in accordance with some embodiments;

FIG. 8 illustrates an example of a calibration image;

FIG. 9A illustrates an intensity peak corresponding with one or more damaged-pixel value(s);

FIGS. 9B-9E illustrate grayscale of an image, red intensity of the image, green intensity of the image, and blue intensity of the image, respectively;

FIG. 9F illustrates examples radiation damaged pixels;

FIG. 10 illustrates a technique of replacing damaged-pixel value using median filter;

FIG. 11 illustrates a variation of the apparatus of FIG. 7;

FIG. 12 illustrates another variation of the apparatus of FIG. 7;

FIG. 13 illustrates a method in accordance with some embodiments; and

FIG. 14 is a diagram of a processing system with which embodiments described herein may be implemented.

DESCRIPTION OF THE EMBODIMENTS

Various embodiments are described hereinafter with reference to the figures. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages of the invention shown. An aspect or an advantage described in conjunction with a particular embodiment is not necessarily limited to that embodiment and can be practiced in any other embodiments even if not so illustrated or if not so explicitly described.

Cameras for Use with Medical Systems

FIG. 1 illustrates a medical system 10. In the illustrated embodiments, the medical system 10 is a radiation treatment system, and it includes an arm gantry 12, a patient support 14 for supporting a patient 20, and a control system 18 for controlling an operation of the gantry 12 and delivery of radiation. The medical system 10 also includes a radiation source 22 that projects a beam 26 of radiation towards the patient 20 while the patient 20 is supported on support 14, and a collimator system 24 for changing a cross sectional shape of the radiation beam 26. The radiation source 22 may be configured to generate a cone beam, a fan beam, or other types of radiation beams in different embodiments. Also, in other embodiments, the source 22 may be configured to generate proton beam as a form of radiation for treatment purpose. Also, in other embodiments, the system 10 may have other form and/or configuration. For example, in other embodiments, instead of an arm gantry 12, the system 10 may have a ring gantry 12.

In the illustrated embodiments, the radiation source 22 is a treatment radiation source for providing treatment energy. In other embodiments, in addition to being a treatment radiation source, the radiation source 22 can also be a diagnostic radiation source for providing diagnostic energy for imaging purpose. In such cases, the system 10 will include an imager, such as the imager 80, located at an operative position relative to the source 22 (e.g., under the support 14). In further embodiments, the radiation source 22 may be a treatment radiation source for providing treatment energy, wherein the treatment energy may also be used to obtain images. In such cases, in order to obtain imaging using treatment energies, the imager 80 is configured to generate images in response to radiation having treatment energies (e.g., MV imager). In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 22 is able to generate X-ray radiation at a plurality of photon energy levels within a range anywhere between approximately 10 keV and approximately 20 MeV. In further embodiments, the radiation source 22 can be a diagnostic radiation source. In such cases, the system 10 may be a diagnostic system with one or more moving parts. In the illustrated embodiments, the radiation source 22 is carried by the arm gantry 12. Alternatively, the radiation source 22 may be located within a bore (e.g., coupled to a ring gantry).

In the illustrated embodiments, the control system 18 includes a processing unit 54, such as a processor, coupled to a control 40. The control system 18 may also include a monitor 56 for displaying data and an input device 58, such as a keyboard or a mouse, for inputting data. The operation of the radiation source 22 and the gantry 12 are controlled by the control 40, which provides power and timing signals to the radiation source 22, and controls a rotational speed and position of the gantry 12, based on signals received from the processing unit 54. Although the control 40 is shown as a separate component from the gantry 12 and the processing unit 54, in alternative embodiments, the control 40 can be a part of the gantry 12 or the processing unit 54.

In some embodiments, the medical system 10 may be a treatment system configured to deliver treatment radiation beam towards the patient 20 at different gantry angles. During a treatment procedure, the source 22 rotates around the patient 20 and delivers treatment radiation beam from different gantry angles towards the patient 20. While the source 22 is at different gantry angles, the collimator 24 is operated to change the shape of the beam to correspond with a shape of the target tissue structure. For example, the collimator 24 may be operated so that the shape of the beam is similar to a cross sectional shape of the target tissue structure. In another example, the collimator 24 may be operated so that different portions of the target tissue structure receive different amount of radiation (as in an IMRT procedure).

As shown in FIGS. 1 and 2, an apparatus 100 is provided for use with the medical system 10. The apparatus 100 includes a camera 130 configured for viewing the patient 20. The apparatus 100 also includes a securing mechanism 132 for securing the camera 130 relative to an object, and a support 134.

The depth sensing camera 130 is configured to sense depths and to generate signals representing the depths. In some embodiments, the depth sensing camera 130 may use structured light for depth measurement (e.g., a Kinect camera). In other embodiments, the depth sensing camera 130 may use time-of-flight method for depth measurement (e.g., Mesa SR4000, or the new Microsoft Kinect2 camera). In further embodiments, the depth sensing camera 130 may be any device that is capable of sensing depth using any known techniques. It should be noted that the term "camera", as used in this specification, may be any device, and should not be limited to a device that provides "image" signals. For example, in some embodiments, the depth sensing camera 130 may be configured to provide depth signals, which may or may not be considered image signals, regardless of whether such depth signals are displayed in image form or not. A depth signal may be any signal indicating a depth or distance, or any signal from with a depth or distance may be derived. By means of non-limiting examples, the signal may be an infrared signal, an ultrasound signal, etc. In some embodiments, the dimensions of the depth sensing camera 130 may be small enough to be non-intrusive to the treatment process when mounted during use. For example, in some embodiments, the camera 130 may have a dimension of 11 inch×2.5 inch×1.5 inch. In other embodiments, the camera 130 may have other dimensions, such as those larger or smaller than the example provided above, as long as the use of the camera 130 does not interfere with the treatment procedure.

Also, in some embodiments, the depth sensing camera 130 may be infrared-based, in which cases, the depth may be sensed by the camera 130 using infrared. In some embodiments, such depth sensing camera 130 may be configured to output infrared video images from which depth images are formed. In some embodiments, these infrared video images may have exactly the same field of view as the depth images. Thus, the infrared video images may be used together with the depth images to determine whether there is a possible collision.

Furthermore, in some embodiments, the camera 130 may include an infrared emitter, a color sensor, and an infrared depth sensor. The infrared depth sensor is configured to sense depth based on infrared signals output by the infrared emitter. The color sensor is configured to sense visible image.

The support 134 may be a post, a bracket, a beam, an arm, etc., for supporting the camera 130. The securing mechanism 132 may be located at the support 134. Also, in some embodiments, the support 134 may optionally have one or more moveable parts to allow a position and/or an orientation of the camera 130 to be adjusted relative to the support 14 (or relative to the patient 20 or another reference location). In some embodiments, the support 134 itself may be movable relative to the support 14 in order to adjust the camera position (e.g., longitudinally) relative to the patient. In further embodiments, the support 134 may be a base with a tilt motor, which allows the camera 130 to be tilted in one, two, or three, degrees of movement relative to the base. In other embodiments, the support 134 is not needed, and the system 100 may not include the support 134.

In the above example, the camera is being described as being mounted to the patient support 14. In other embodiments, the camera may be mounted directly or indirectly to any structure of a building, such as a ceiling, a beam, a column, a wall. FIG. 3 illustrates another medical system 10 and cameras that are mounted indirectly to a ceiling. The medical system 10 of FIG. 3 may be considered as an example, or a variation, of the medical system 10 of FIG. 1. The medical system 10 of FIG. 3 is a treatment system that includes a gantry 12, a patient support 14 for supporting a patient (not shown), and a control system 18 for controlling an operation of the gantry 12. The gantry 12 is in a form of an arm, but in other embodiments, the gantry 12 may have other forms (such as a ring form, etc.). The system 10 also includes a radiation source 20 that projects a beam 26 of radiation towards a patient while the patient is supported on support 14, and a collimator system 22 for controlling a delivery of the radiation beam 26. The collimator may be configured to adjust a cross sectional shape of the beam 26. The radiation source 20 can be configured to generate a cone beam, a fan beam, or other types of radiation beams in different embodiments. In some cases, the system 10 may include an imager located at an operative position relative to the source 20 (e.g., under the support 14).

As shown in FIG. 3, the system 10 also includes an optical system 150. The optical system 150 includes a light source 152, multiple cameras 154, and a processing unit 156 in communication with the cameras 154. In the illustrated example, the light source 152 is configured to provide structured light and/or non-structured light. Also, as shown in the figure, the optical system 150 has three cameras 154. In other embodiments, the optical system 150 may have fewer than three cameras 154 (e.g., one camera 154 or two cameras), or more than three cameras 154. Also, in other embodiments, the optical system 150 may include multiple light sources 152. In addition, in some embodiments, two or more cameras may be placed in a side-by-side configuration in close proximity to each other (e.g., within 3 ft, with 2 ft, with 1 ft, etc.). In other embodiments, two or more cameras may be placed far from each other (e.g., more than 3 ft, more than 4 ft, etc.).

Also, in some embodiments, the structured light and/or non-structured light provided by the light source 152 may be in an infrared range (e.g., having infrared wavelength(s)). This technique obviates the need to use very intense light source(s), which may "blind" the patient, particularly during head, neck, and breast treatments in which the light is directed towards the upper part of the patient. In other embodiments, the light source 152 may be configured to provide non-visible light having other wavelengths (e.g., ultraviolet light). Also, use of non-visible light is advantageous because unlike video-based system that uses visible wavelengths, it does not exhibit stroboscopic effects that may confuse the patient, and it does not trigger symptoms of motion thickness.

The optical system 150 may also optionally include a frame 160 to which the cameras 154 and the light source 152 may be mounted. The frame 160 is illustrated as being mounted to a ceiling. In alternative embodiments, the frame 160 may be mounted to a beam, a column, or a wall of a room in which the treatment system 10 is located. In further embodiments, the frame 160 may be mounted to the treatment system 10 (FIG. 4). The cameras 154 with the frame 160 may be preassembled at a factory, which allows easy installation at the medical facility. The cameras 154 may be moveably mounted to the frame 160. In one implementation, each of the cameras 154 may be rotatably mounted to the frame 160 (e.g., via a ball joint) so that the camera 154 is rotatable about one or more axes with respect to the frame 160. Similarly, the light source 152 may be moveably mounted to the frame 160. For example, the light source 152 may be rotatably mounted to the frame 160 (e.g., via a ball joint) so that the light source 152 is rotatable about one or more axes with respect to the frame 160. In other embodiments, instead of ball joints, the cameras 154 and the light source 152 may be moveably mounted to the frame 160 using other connectors, such as arms, so that the cameras 154 and the light source 152 are moveable with respect to the frame 160. In other embodiments, the one or more of the cameras 154 and/or the light source 152 may be mounted directly to the treatment system 10 or a room.

Furthermore, in other embodiments, instead of having only one light source 152 for each camera 154, the optical system 150 may include multiple light sources 152 for each camera 154. In some embodiments, each of the light sources 152 may be configured to provide structured light and non-structured light. In other embodiments, one or more of the light sources 152 may be configured to provide structured light, while another one or more of the light sources 152 may be configured to provide non-structured light.

Also, in some embodiments, the light source 152 may be integrated with one or more cameras 154. For example, in one implementation, the optical system 150 may include multiple pods, wherein each pod may have one or more light sources 152 and one or more cameras 154 (e.g., two cameras 154).

As shown in FIG. 1, the optical system 150 may also optionally include a plurality of time-of-flight (TOF) cameras 158. Each TOF camera 158 is configured to provide depth image(s). A depth image has pixel values representing a distance between a reference point and a surface point detected. In some embodiments, each TOF camera 158 may be an infrared camera. During use, images from the cameras 154 and the TOF cameras 158 are processed by the processing unit 156 to obtain and monitor surface contours of the patient before and during treatment for the purpose of patient setup (absolute positioning and/or relative positioning), patient monitoring during treatment (e.g., monitoring absolute position and/or relative position), tool surveillance, prevention of patient-machine collisions, or a combination of the foregoing. Patient monitoring may include: (1) ensuring that the patient does not leave its setup position, and/or (2) recording a periodic patient motion due to breathing, and controlling a machine accordingly (e.g., beam hold, multi-leave collimator tracking, tracking of patient support, etc.).

In the illustrated example, the optical system 150 has two TOF cameras 158. In other embodiments, the optical system 150 may include more than two (e.g., three, four, etc.) TOF cameras 158, or fewer than two (i.e., one) TOF camera 158.

In some embodiments, the optical system 150 may include multiple pods, wherein each pod may have one or more light sources 152, one or more cameras 154 (e.g., two cameras 154), and one or more TOF cameras 158. For example, there may be a first pod having one or more light sources 152 and two cameras 154, and a second pod having one or more light source 152 and two cameras 154. In addition, in some embodiments, a pod may include another type or auxiliary camera or depth measurement device. For example, apart from TOF camera, a pod may include ultrasonic distance sensor(s), light sensitive guard(s), or laser scanner(s). In some embodiments, a pod may also include one or more regular video camera(s). In such cases, a processor may obtain information from the regular video camera(s), and merge that information with 3D images. The video cameras may be used to detect markers with known geometric properties to obtain additional geometric 3D information. In further embodiments, the optical system 150 may include a web camera in each pod. In some cases, the image from the web camera or regular video camera may be overlaid on a detected surface or distance map. This may help to define a region of interest. For example, if a user does not see a surface representation of a user interface screen, but can see a realistic photograph of the scene, then the user may still define the region of interest using the user interface.

In some embodiments, the pod(s) may be mounted to a frame of the optical system 150. In other embodiments, the pod(s) may be mounted to a different frame than that of the optical system 150. Also, in further embodiments, the pod(s) may be configured to be mounted to the medical system 10, e.g., to the gantry, to the patient support. In some cases, the pod(s) may be mounted to deployable arms that are coupled to the medical system 10. In other embodiments, the pod(s) may be mounted to a room (e.g., to a wall, a ceiling, a floor, etc.).

The optical system 150 may be configured to provide patient setup, patient monitoring, device monitoring, respiratory motion control, patient-machine collision prevention, or any combination of the foregoing. Thus, in some cases, the same optical system 150 may provide multiple purposes. In some embodiments, different clinical use cases mentioned above may be performed simultaneously. In one implementation, the sequence of real-time input images from the camera(s) 154 and from the TOF camera(s) 158 may be processed by the processing unit 156 to perform patient-machine collision prevention. The same real-time input images (or a subset of them) from the camera(s) 154, and the same real-time input images (or a subset of them) from the TOF camera(s) 158 may also be processed by the processing unit 156 to perform patient monitoring and/or device monitoring. Also, in some embodiments, by combining external surface information of the patient (provided by the optical system 150) with x-ray imaging of the internal anatomy, highly integrated and automated treatment workflows may be achieved.

It should be noted that cameras for use with medical systems are not limited to the examples described, and that the cameras may have other configurations. For example, as shown in FIG. 5, a camera 500 for use with a medical system may be mounted ceiling, wherein the camera 500 is configured to provide a live view of an environment that includes the patient and/or component(s) of the medical system. Also, one or more CCTV cameras 502, 504 mounted to a wall may be provided for viewing the patient and/or component(s) of the medical system. In some embodiments, the medical system may include a medical device, such as a radiation machine, configured to treat and/or image a patient. In some cases, the radiation machine may be a treatment radiation machine. In other cases, the radiation machine may be a treatment machine with imaging capability. In further cases, the radiation machine may be a x-ray machine, a CT machine, a PET machine, a SPECT machine, etc., configured to image a patient.

Image Correction to Address Radiation-Damaged Pixels in Camera.

When using a camera with a medical device that produces radiation as a result of operation of the medical device, pixels in the camera can be damaged from such radiation over time.

FIG. 6A illustrates an example of an image 600 received from a camera, particularly showing the image having noise due to damaged pixels of a camera. As shown in the figure, the image 600 includes many bright spots 602, each of which is from a radiation-damaged pixel in the camera. Embodiments described herein provide different techniques for correcting the damaged-pixel values in camera images. As a result of using any of these techniques, noise in a camera image resulted from radiation-damaged pixels may be eliminated or significantly reduced. For example, using any techniques described herein, the image 600 may be improved to become the image 610 shown in FIG. 6B. As shown in the figure, the number of bright spots due to radiation-damaged pixels in the camera is substantially reduced. In some cases, the number of bright spots due to radiation-damaged pixels may be reduced by at least 50%, and more preferably by at least 75%, and even more preferably by at least 90%.

FIG. 7 illustrates an apparatus 700 in accordance with some embodiments. The apparatus 700 is configured to communicatively couple with a camera 701. For examples, the apparatus 700 may be coupled to the camera 701 via a cable or via a wireless connection. The apparatus 700 is configured to receive image(s) from the camera 701 during use, and correct one or more pixel values in the image(s). As shown in the figure, the apparatus 700 includes an input 702, a processing unit 710, and an output 720. The input 702 may be a physical interface for receiving image(s) from the camera 701. Alternatively, the input 702 may be any communicative interface (e.g., data interface, logical interface) that receives image(s) from the camera 701, wherein the interface may be implemented using hardware, software, or a combination of both. Similarly, the output 720 may be a physical interface for outputting improved image(s). For example, the improved image(s) may be outputted by the output 720 to another processing unit that processes the improved image(s), to a display for displaying the improved image(s), to a medium for storing the improved image(s), or any combination of the foregoing.

The camera 701 may be any camera capable of outputting one or more images. By means of non-limiting examples, the camera 701 may be a live view camera, a CCTV camera, a visible-light-based camera, a non-visible-light based camera, etc. In some embodiments, each image from the camera 701 may have an image size of 1920×1080. In other embodiments, each image from the camera 701 may have an image size of 640×480. In further embodiments, each image from the camera 701 may have other image sizes. Also, in some embodiments, the camera 701 may be configured to provide live view of an environment in a medical facility. In such cases, the camera 701 may be configured to provide live images in real-time.

In the illustrated embodiments, the image outputted from the camera 701 includes one or more damaged-pixel value(s) resulted from damaged pixel(s) in the camera 701. Such damage may be due to exposure of radiation by the electronics in the camera 701. The apparatus 700 is configure to output an improved image in which the damaged-pixel value(s) has been replaced with replacement pixel value(s). As a result, the improved image has less noise compared to the image outputted by the camera 701, and the improved image may be utilized in one or more medical processes to obtain more reliable and accurate outcome.

In the illustrated embodiments, the processing unit 710 includes a damaged pixel locator 712 configured to obtain locations of damaged pixels in the camera 701. The processing unit 710 also includes a damaged-pixel value replacement module 716 configured to replace one or more damaged-pixel values in a camera image with one or more replacement pixel values, respectively, based on the location(s) of the damaged pixel(s) in the camera 701. The processing unit 710 also includes a medium 730 for storing location(s) of the damaged pixel(s) of the camera 701. The medium 730 may be a memory, a hard drive, or any storage device capable of storing data. The medium 730 is accessible by the damaged pixel locator 712 during use of the apparatus 700. The processing unit 710 also includes a calibration module 740 configured to identify one or more damaged pixels in the camera 701 before the camera 701 is used in a medical process. The calibration module 740 is configured to output the location(s) of the damaged pixel(s) for storage in the medium 730.

In some embodiments, the calibration module 740 is configured to obtain an image from the camera 701, and use the image as a calibration image. The calibration module 740 then processes the calibration image to identify one or more damaged-pixel values in the calibration image.

FIG. 8 illustrates an example of a calibration image 800 generated by the camera 701. In some embodiments, the processing unit 710 may be configured to operate the camera 701 to generate the calibration image. In some embodiments, the processing unit 710 is configured to operate the camera 701 to generate the calibration image 800 when the camera 701 is covered by a lens cap. In other embodiments, the processing unit 710 is configured to operate the camera 701 to generate the calibration image 800 when the camera 701 is viewing a black or dark area. In such cases, a black surface may be placed next to the camera 701, and the camera 701 may be turned (e.g., manually by a person, or mechanically by a positioner—e.g., automatically turned by a computer control of an electro-mechanical actuator control system) periodically to view the black surface to generate the calibration image 800. In further embodiments, the processing unit 710 is configured to operate the camera 701 to generate the calibration image 800 when the camera 701 is in a low-lighting or no-light environment. In one implementation, the apparatus 700 may include a light sensor for detecting an amount of light present outside the camera 701. If the amount of light is below a threshold, the processing unit 710 may automatically operate the camera 701 to generate the calibration image 800. In still further embodiments, the processing unit 710 is configured to operate the camera 701 to generate the calibration image 800 when an image shutter or a chopper is blocking light into the camera 701. In further embodiments, the processing unit 710 is configured to operate the camera 701 to generate the calibration image 800 when a mechanical blocker outside the camera 701 is positioned to block light into the camera.

In other embodiments, instead of the processing unit 710 operating the camera 701 to generate the calibration image 800, an operator may operate the camera 701 to generate the calibration image 800. For example, in other embodiments, the operator may operate the camera 701 to generate the calibration image 800 when the camera 701 is covered by a lens cap, when the camera 701 is viewing a black or dark area, when the camera 701 is in a low-lighting or no-light environment, when an image shutter or a chopper is blocking light into the camera 701, or when a mechanical blocker outside the camera 701 is positioned to block light into the camera 701.

As shown in FIG. 8, a majority (e.g., region 802) of the calibration image 800 is black or dark. The calibration image 800 includes bright spots 810 that are brighter than the darker region 802. The bright spots 810 are from the damaged pixels in the camera 701 that are damaged due to radiation. By identifying the bright spots 810 in the calibration image 800, the processing unit 710 can determine the location of the damaged pixels in the camera 701. In one implementation, the processing unit 710 may include a calibration module 740 configured to identify the bright spots 810 in the calibration image 800. If a pixel value has an intensity that is above a threshold, then the calibration module 740 may identify the pixel value as a damaged-pixel value. This technique can reliably identify damaged pixels because when the camera 701 is imaging a dark scenery, good pixels will produce pixel values that are close to zero, and damaged pixels will produce high pixel values (e.g., values that are more than 100 on an intensity scale from 0 to 255). In some embodiments, the calibration module 740 may be configured to identify a pixel value in the calibration image 800 as a damaged-pixel value if the pixel value is more than a threshold, wherein the threshold may be set as 80, 90, 100, 110, 120, 130, 140, 150, 160, 170, 180, 190, 200, 210, 220, 230, 240, or 250.

FIG. 9A illustrates an intensity peak 900 corresponding with one or more damaged-pixel value(s). The intensity peak 900 may correspond with one of the bright spots 810, or a group of bright spots 810, in the calibration image 800 in FIG. 8. The peak 900 has a peak value that is higher compared to its surrounding area due to fixed pattern noise attributable to pixel damaged by radiation. The width of the peak 900 is proportional to a speckle noise size. Outside the area of the peak 900, e.g., at the side-lobe region, the variations of the values are due to the scene content and they are unrelated to radiation-damaged pixel(s). In some embodiments, the calibration module 716 of the processing unit 710 is configured to quantify the local peak value after subtracting the information due to the scene content. The calibration module 716 may also be configured to identify the sub-region(s) for which this subtraction can be done with high confidence, thus limiting the noise measurement to the sub-region(s) only.

Also, in some embodiments, the calibration module 740 of the processing unit 710 may be configured identify damaged-pixel values using a grayscale of the calibration image. An example of a grayscale of a calibration image is shown in FIG. 9B. The grayscale of the calibration image may be generated based on a red intensity or red component of the calibration image (FIG. 9C), a green intensity or green component of the calibration image (FIG. 9D), and a blue intensity or blue component of the calibration image (FIG. 9E). FIGS. 9C-9E are presented as black-and-white figures, but it should be understood that the color version of FIG. 9C will be in different intensities of red, the color version of FIG. 9D will be in different intensities of green, and the color version of FIG. 9E will be in different intensities of blue. In some embodiments, the grayscale of the calibration image may be generated based on the equation: $G=k_1*R+k_2*G+k_3*B$, wherein G represents a grayscale intensity of a pixel, R represents a red intensity of the pixel, G represents a green intensity of the pixel, and B represents a blue intensity of the pixel. In the above equations, $k_1$, $k_2$, and $k_3$ are factors, and they can be any values. In some embodiments, $k_1=0.3$, $k_2=0.59$, and $k_3=0.11$.

In some embodiments, the calibration module 716 is configured to obtain the grayscale of the calibration image, and identify damaged-pixel values. As shown in FIG. 9B, damaged-pixel values, such as the one with value "100", are generally higher than the surrounding pixel values (such as the ones with values 31, 39, 49, 45, 48, which are good pixel values). The ones immediately next to the pixel with the value "100" (e.g., the pixels with pixel values 71, 50, 49, 77) are not as high as the one with "100", but they are still higher than the surrounding pixel values (such as the ones with values 31, 39, 49, 45, 48, which are good pixel values). Accordingly, the calibration module 716 may determine that the pixel value "100" is a damaged-pixel value, and may also determine that the ones immediately next to the one with pixel value "100" are also damaged-pixel values. The calibration module 716 may store the locations of these identified damaged-pixel values in the medium 730.

In other embodiments, the red, green, and blue intensities or components of the calibration image may be processed by the calibration module 716 individually. In some cases, if only one of the RGB (red-green-blue) components is damaged, the component value for the damaged pixel would be much higher than the value of the grayscale (e.g., calculated based on 0.3*R+0.59*G+0.11*B). This is because the individual red, green, and blue components are not weighted like the gray scale. Therefore, the damaged-pixel values can be identified easier by the calibration module 716 if the RGB components are evaluated individually. FIG. 9F illustrates examples of different damaged pixels resulted from radiation exposure. As shown in the figure, a damaged pixel may have the red component damaged, the blue component damage, the green component damaged, or two of the three components damaged. Also, in some cases, all three color components of a pixel may be damaged. In some embodiments, if a pixel value in a color component (e.g., red component) of the calibration image is determined as a damaged-pixel value, then the corresponding pixel of the camera 701 is considered a damaged pixel (regardless of whether the other color components is damaged or not).

After the calibration module 716 of the processing unit 710 has identified all of the damaged pixels, the locations of the damaged pixels may be stored in the medium 730. In some embodiments, the medium 730 may contain a lookup table storing the locations (e.g., X,Y coordinates) of the identified damaged pixels. In the illustrated embodiments, the medium 730 is illustrated as a part of the processing unit 710. In other embodiments, the medium 730 may not be a part of the processing unit 710, but may be a part of the apparatus 700. In still further embodiments, the medium 730 may be implemented outside the apparatus 700. For example, in other embodiments, the medium 730 may be a storage device that is communicatively coupled to the apparatus 700. In further embodiments, the medium 730 may be inside the camera 701, or coupled outside the camera 701, so that it is implemented as a part of the camera 701. This allows the camera 701 itself to know the locations of its damaged pixels. Also, in some embodiments, the camera 701 may have a processing unit that corrects images before they are outputted by the camera 701 based on the locations of the damaged pixels. In one implementation, the apparatus 700 or the processing unit 710 may be implemented inside the camera 701.

It should be noted that the identification of damaged pixels may be performed by the calibration module 740 (e.g., during a calibration procedure) at any time, and/or at any frequency. For example, in some embodiments, the calibration module 740 may identify the damaged pixels in a calibration image before a medical process (e.g., radiation treatment) that involves use of the camera 701. The identification of the damaged pixels may occur within an hour (e.g., within 10 minutes, 15 minutes, 30 minutes, etc.) before the medical process begin. In other embodiments, the calibration module 740 may perform the damaged pixel identification whenever there is no light in the environment. In further embodiments, the calibration module 740 may be configured to periodically perform the damaged pixels identification, such as according to a schedule. In still further embodiments, the calibration module 740 may perform the damaged pixels identification in response to a user input that instructs the calibration module 740 to perform such damaged pixels identification in a calibration image from the camera 701. In further embodiments, the calibration module 740 may perform identification of damaged pixels while the camera 701 is used in a medical process. In such cases, the calibration module 740 may use one of the images from a livestream, and perform real-time detection of the damaged-pixel values.

During use of the camera 701 in a medical process, the damaged pixel locator 712 of the processing unit 710 may access the medium 730 to obtain locations of damaged pixels in the camera 701. The damaged-pixel value replacement module 716 of the processing unit 710 may then perform image correction to replace damaged-pixel values in images output from the camera 701. In particular, the damaged-pixel value replacement module 716 may be configured to replace damaged-pixel values in images based on the locations of damaged pixels obtained by the damaged pixel locator 712. For example, if the medium 730 stores a damaged-pixel coordinate as (X=246, Y=772), and the damaged pixel locator 712 obtains such coordinate, then the damaged-pixel value replacement module 716 may automatically replace the pixel value at coordinate (X=246, Y=772) in each of the images generated by the camera 701 during the medical process. In some embodiments, the damaged-pixel value replacement module 716 of the processing unit 710 may use a medial filter to determine a replacement pixel value.

FIG. 10 illustrates an example of a technique of replacing a damaged-pixel value using median filter. In the illustrated example, the pixel value "10" has been identified as a damaged-pixel value by the processing unit 710. In order to determine a replacement pixel value for replacing the pixel value "10", the damaged-pixel value replacement module 716 determines a median of the pixel values within a 3×3 pixel area with the pixel value "10" being at the center of the pixel area. Following the above example, the median of the pixel values within the 3×3 pixel area is "4". Accordingly, the damaged-pixel value replacement module 716 replaces the damaged-pixel value "10" with the replacement pixel value "4".

In other embodiments, the damaged-pixel value replacement module 716 may not consider the damaged-pixel value "10" when determining the median of the pixel values in the 3×3 pixel area. In such cases, the median would be determined based on the eight pixel values surrounding the damaged-pixel value.

In further embodiments, instead of the 3×3 pixel area, the damaged-pixel value replacement module 716 may determine the replacement pixel value based on pixel area having other sizes. For example, in other embodiments, instead of the 3×3 pixel area, a 5×5 pixel area, 7×7 pixel area, etc. In general, N×N pixel area may be used, wherein N is any integer, such as any old integer, larger than 1. Also, in other embodiments, the pixel area may not be a square. Instead, the pixel area for determining the replacement pixel value may be a square, such as a 3×5 pixel area, a 5×7 pixel area, etc.

Also, in other embodiments, instead of using a median filter, the damaged-pixel value replacement module 716 may determine an average of the pixel values within a 3×3 pixel area with the pixel value "10" being at the center of the pixel area. Following the above example, the average of the pixel values within the 3×3 pixel area is (3+3+3+4+4+5+5+5+

10)/9=4.7. Accordingly, the damaged-pixel value replacement module 716 replaces the damaged-pixel value "10" with the replacement pixel value "4.7". Alternatively, when calculating the average of the pixel values, the damaged-pixel value replacement module 716 may not include the value of the damaged pixel (i.e., "10" in the example). In such cases, the average of the eight pixel values surrounding the damaged pixel becomes (3+3+3+4+4+5+5+5)/8=4. Accordingly, the damaged-pixel value replacement module 716 may replace the damaged-pixel value "10" with the replacement pixel value "4".

In some embodiments, the damaged-pixel value replacement module 716 goes through all of the damaged-pixel values based on the locations of the damaged pixels retrieved from the medium 730 by the damaged pixel locator 712. For example, if there are 80 damaged pixels in the camera 701, the damaged-pixel value replacement module 716 may perform the pixel replacement 80 times for the respective 80 damaged pixels. The replacement pixel values for the different damaged-pixel values (at different locations of an image) will be different from each other, because each replacement pixel value is determined based on surrounding pixel values at different areas in the image.

In the above example of FIG. 10, the damaged-pixel value replacement module 716 is described as being configured to replace one pixel surrounded by eight other pixels. In other embodiments, the damaged-pixel value replacement module 716 may be configured to replace multiple pixels that are adjacent to each other. For example, in other embodiments, the damaged-pixel value replacement module 716 may be configured to replace all nine pixels in the 3×3 pixel area that includes the damaged-pixel value in the middle. This may be the case sometimes because the width of the intensity peak 900 (FIG. 9) may extend several pixels in width, and/or because several pixels next to each other may be damaged. In such cases, the damaged-pixel value replacement module 716 may determine replacement pixel values for replacing a cluster of damaged-pixel values based at least in part on pixel values of pixels surrounding the cluster of damaged-pixel values of the damaged pixels. As similarly discussed, in some embodiments, the damaged-pixel value replacement module 716 may determine a median value as a replacement pixel value, wherein the median value is based on a group of pixel values that may include the damaged-pixel values, or that may exclude the damaged-pixel values. Also, as similarly discussed, in some embodiments, the damaged-pixel value replacement module 716 may determine an average value as a replacement pixel value, wherein the average value is calculated based on a group of pixel values that may include the damaged-pixel values, or that may exclude the damaged-pixel values.

In the above embodiments, the processing unit 710 is described as having a calibration module 740 for determining locations of damaged pixels in the camera 701, the medium 730 for storing the determined locations of the damaged pixels, and the damaged pixel locator 712 for accessing the medium 730 to obtain the locations of the damaged pixels. In other embodiments, the processing unit 710 may replace the damaged-pixel value in an image without using damaged-pixel locations determined previously in a separate calibration algorithm. In such cases, the processing unit 710 may not include the damaged pixel locator 712, the medium 730, and the calibration module 740 (FIG. 11). In particular, the apparatus 700 of FIG. 11 is the same as the apparatus 700 of FIG. 7, except that the processing unit 710 does not include the damaged pixel locator 712, the medium 730, and the calibration module 740.

During use of the apparatus 700 of FIG. 11, the camera 701 generates images, and the input 702 of the apparatus 700 receives the images from the camera 701. The processing unit 710 in such cases includes the damaged-pixel value replacement module 716, which is configured to replace all damaged-pixel values in an image with respective replacement pixel values. In one implementation, the damaged-pixel value replacement module 716 of the processing unit 710 is configured to indiscriminately process all of the pixel values in the image using a moving window that is sequentially applied to all of the pixel values. In some embodiments, the moving window may be a 3×3 pixel window (i.e., 3 pixels by 3 pixels). In such cases, the damaged-pixel value replacement module 716 applies the moving window to sequentially process different groups of 9 pixels in the image, one at a time, until all of the pixels in the image has been processed. In one implementation, for each of a sequence of positions at which the 3×3 pixel window is applied in the image, the damaged-pixel value replacement module 716 of the processing unit is configured to replace a center-pixel value in the 3×3 pixel window with a replacement pixel value that is determined as an average or a median using at least some of the pixels in the 3×3 window, as similarly described with reference to FIG. 10. If the center pixel value happens to be a damaged-pixel value, then the above technique would replace such damaged-pixel value with the replacement pixel value. Because the replacement pixel value is closer in magnitude to the pixel values of the surrounding pixels (compared to the damaged-pixel value that is further in magnitude than the pixel values of the surrounding pixels), the replacement of the damaged-pixel value with the replacement pixel value would improve the image quality of the image portion in the 3×3 window. On the other hand, if the center pixel value is not a damaged-pixel value, replacing such center pixel value with the replacement pixel value would not significantly alter the image. This is because the replacement pixel value (determined as an average or median of at least the adjacent pixel values) is not too different from the original pixel value. In some cases, replacing a good (not damaged) pixel value with the replacement pixel value may cause the image portion in the 3×3 window to have a slightly reduced resolution. However, this may be acceptable if the camera image has a resolution that is more than what is needed for the application of the camera 701. For example, if the camera 701 produces images with 6-mega-pixel resolution, and the resolution needed for using the camera 701 to perform patient monitoring and/or monitoring of component(s) of medical system is 4-mega-pixel, then the above technique of pixel replacement technique may be acceptable.

In other embodiments, instead of replacing the center pixel value with a median or an average pixel value for each position of the 3×3 window, the damaged-pixel value replacement module 716 may be configured to do such replacement only if the center pixel value is a damaged-pixel value. In one implementation, for each of a sequence of positions at which the 3×3 pixel window is applied in the image, the damaged-pixel value replacement module 716 of the processing unit is configured to either (1) replace a center-pixel value in the 3×3 pixel window with a replacement pixel value, or (2) keep the center-pixel value in the 3×3 pixel window. In some embodiments, the damaged-pixel value replacement module 716 is configured to determine if a center-pixel value in the 3×3 pixel window is a damaged-pixel value. If so, the damaged-pixel value replacement module 716 then determines the median or average pixel value based at least in part on adjacent pixel values, and uses it to replace the damaged-pixel value. Otherwise, the damaged-pixel value replacement module 716 will keep the original center-pixel value in the 3×3 pixel window.

Various techniques may be employed by the damaged-pixel value replacement module 716 to determine if a pixel value in the image from the camera 701 is a damaged-pixel value. In some embodiments, the damaged-pixel value replacement module 716 is configured to compare the center pixel value in the 3×3 pixel window with its adjacent pixel values. If the center pixel value is higher than the adjacent pixel values by a threshold, then the damaged-pixel value replacement module 716 may determine that the center pixel value is a damaged-pixel value. In some embodiments, the comparison of the center pixel value with adjacent pixel values may be achieved by comparing the center pixel value with an average or an median of the adjacent pixel values. The threshold for identifying damaged-pixel value may be selected to ensure that a pixel value is significantly different from its adjacent pixel values before it can be considered as a damaged-pixel value.

In other embodiments, instead of using a 3 pixel by 3 pixel window, the processing unit 710 of FIG. 11 may use other window size to process images from the camera 701. For example, in other embodiments, the processing unit 710 may use a 5×5 window, a 7×7 window, or any N×N window in which N is any integer larger than 1. Also, in other embodiments, the window may not have a square shape, and may instead have a rectangular shape. Also, in other embodiments, the center pixel value does not need to be a pixel value that is exactly in a center of a window. Instead, the center pixel value may be any pixel value that is surrounded by adjacent pixel values.

In other embodiments, the processing unit 710 may utilize other techniques to replace the damaged-pixel value in an image without using damaged-pixel locations determined previously in a separate calibration algorithm. For example, in other embodiments, the processing unit 710 may be configured to receive images from two different cameras, and use pixel in an image from a first camera to replace a damaged-pixel value in an image from a second camera (FIG. 12). In particular, the apparatus 700 of FIG. 12 is the same as the apparatus 700 of FIG. 11, except that the apparatus 700 is communicatively coupled to the camera 701 and an additional camera 1200. In the illustrated embodiments, the cameras 701, 1200 are arranged in a side-by-side configuration so that they view towards a same environment, resulting in imaging of the same scene by the cameras 701, 1200. The damaged-pixel value replacement module 716 of the processing unit 710 is configured to replace damaged-pixel values in the image from the camera 701 with corresponding pixel values in the image from the additional camera 1200.

During use of the apparatus 700 of FIG. 12, the cameras 701, 1200 generate respective images, and the input 702 of the apparatus 700 receives the images from the cameras 701, 1200 via the input 702. In the illustrated embodiments, the damaged-pixel value replacement module 716 of the processing unit 710 is configured to replace the damaged-pixel values in an image from the camera 701 with respective replacement pixel values. In one implementation, the damaged-pixel value replacement module 716 is configured to process all of the pixel values in the image using a moving window that is sequentially applied to all of the pixel values, like that described with reference to FIG. 11. However, unlike the embodiments of FIG. 11 in which a median or an average pixel value is used to replace a center pixel value in the moving window, the damaged-pixel value replacement module 716 in the embodiments of FIG. 12 is configured to use a good pixel value from an image in the additional camera 1200 for replacing the center pixel value in the image from the camera 701. This technique takes advantage of the fact that while both cameras 701, 1200 may have radiation-damaged pixels, the chance that the damaged pixels occurring at the same respective locations in the camera 701, 1200 is very small. Accordingly, if a pixel in the camera 701 is damaged, the corresponding pixel in the additional camera 1200 is likely not damaged.

In the embodiments of FIG. 12, the moving window may be a 3×3 pixel window (i.e., 3 pixels by 3 pixels). In such cases, the damaged-pixel value replacement module 716 applies the moving window to sequentially process different groups of 9 pixels in the image, one at a time, until all of the pixels in the image has been processed. In one implementation, for each of a sequence of positions at which the 3×3 pixel window is applied in the image, the damaged-pixel value replacement module 716 of the processing unit is configured to either (1) replace a center-pixel value in the 3×3 pixel window with a replacement pixel value from an image generated by the additional camera 1200, or (2) keep the center-pixel value in the 3×3 pixel window. In some embodiments, the damaged-pixel value replacement module 716 is configured to determine if a center-pixel value in the 3×3 pixel window is a damaged-pixel value. If so, the damaged-pixel value replacement module 716 then obtains the corresponding pixel value in the image from the additional camera 1200, and uses it to replace the damaged-pixel value. Otherwise, the damaged-pixel value replacement module 716 will keep the original center-pixel value in the 3×3 pixel window.

Various techniques may be employed by the damaged-pixel value replacement module 716 to determine if a pixel value in the image from the camera 701 is a damaged-pixel value. In some embodiments, the damaged-pixel value replacement module 716 is configured to compare the center pixel value in the 3×3 pixel window with its adjacent pixel values. If the center pixel value is higher than the adjacent pixel values by a threshold, then the damaged-pixel value replacement module 716 may determine that the center pixel value is a damaged-pixel value. In some embodiments, the comparison of the center pixel value with adjacent pixel values may be achieved by comparing the center pixel value with an average or an median of the adjacent pixel values. The threshold for identifying damaged-pixel value may be selected to ensure that a pixel value is significantly different from its adjacent pixel values before it can be considered as a damaged-pixel value.

In other embodiments, instead of using a 3 pixel by 3 pixel window, the processing unit 710 of FIG. 12 may use other window size to process images from the camera 701. For example, in other embodiments, the processing unit 710 may use a 5×5 window, a 7×7 window, or any N×N window in which N is any integer larger than 1. Also, in other embodiments, the window may not have a square shape, and may instead have a rectangular shape. Also, in other embodiments, the center pixel value does not need to be a pixel value that is exactly in a center of a window. Instead, the center pixel value may be any pixel value that is surrounded by adjacent pixel values.

In one or more embodiments described herein, the improved image outputted by the apparatus 700 may be utilized during a medical process. By means of non-limiting examples, the improved image outputted by the apparatus 700 may be utilized to monitor a position of the patient (e.g., as during a patient setup procedure), to monitor a physiological state of the patient (e.g., determine a respiratory phase, which may be used to control delivery of treatment energy), to monitor a position of a component of the medical system, to prevent a collision between the medical device and the patient, to prevent a collision between the medical device and a patient support, to identify the patient and/or to confirm an identity of the patient, to perform surveillance of the medical facility, or any combination of the foregoing. One or more of these features may be performed by an additional processing unit that is communicatively coupled downstream with respect to the apparatus 700.

In some embodiments, the additional processing unit may include (1) a patient setup module configured to perform the patient setup, (2) a patient monitoring module configured to perform the patient monitoring (e.g., for monitoring a position of the patient and/or a physiological state of the patient), (3) a device monitoring module configured to perform the device monitoring (e.g., monitoring one or more components of a medical system), a respiratory motion controller configured to perform the respiratory motion control, (4) a patient-machine collision prevention module configured to perform the patient-machine collision prevention, (5) a component collision prevention module configured to perform component-to-component collision prevention, (6) a patient identification module configured to identify the patient and/or to confirm an identity of the patient, (7) a surveillance module configured to surveil a medical facility, or any combination of the foregoing. In some cases, the component-to-component collision prevention module may be configured to monitor a moving gantry and a patient support to prevent collision between these two components (or devices). As another example, the component-to-component collision prevention module may be configured to monitor an imaging panel (e.g., a kV panel) and a position detection device (e.g., a Calypso console) to prevent collision between these two components (or devices).

In some embodiments, one or more of the above-mentioned modules may be configured to process improved images from the apparatus 700 to achieve their respective objectives. For example, one or more of the above-mentioned modules may be configured to identify feature(s) in each image, wherein the feature(s) may be one or more fiducials, such as markers coupled to components of the medical system and/or markers coupled to the patient. The one or more fiducials may alternatively be one or more landmarks on the patient. The feature(s) in an image may also be a moving object, such as a moving medical device component, or a person who is moving. The improved images outputted by the apparatus 700 are advantageous because they are more clear and contain less noise compared to the originally generated images from the camera (which has damaged pixels). As a result, one or more of the above-mentioned modules can more reliably perform their respective tasks to achieve accurate outcome.

In order for one or more of the above-mentioned modules to perform their functions, the module(s) will need to receive the improved images from the apparatus 700 in real-time. In particular, in some embodiments, the images from the camera 701 are real-time images. In such cases, the camera 701 is configured to repeatedly generate a sequence of real-time images during a medical process, and the apparatus 700 processes these images to output corresponding improved images in real-time (e.g., within a short time after each camera image is generated, such as within 1 second, and more preferably within 0.5 second, and more preferably within 0.1 second). Thus, in some embodiments, the processing unit 710 of the apparatus 700 is configured to perform pixel value correction for the entire image within 1 second, or within 0.5 second, or within 0.1 second, after the image is generated by the camera.

As illustrated in the above embodiments, the apparatus 700 is advantageous because it allows a camera with damaged pixels to be used in a medical process. The apparatus 700 obviates a need to use camera with electronics that are radiation tolerant or radiation hardened to prevent radiation damage. Thus, with the apparatus 700, an off-the-shelf camera or any camera that is not radiation hardened may be utilized in a medical environment that has radiation. This saves significant costs because a radiation hardened camera may cost ten times or more than a camera that is not radiation hardened. The camera is allowed and is expected to have more and more damaged pixels over time due to radiation exposure, and the apparatus 700 will correct images output by such camera to address the damaged pixels. Thus, the apparatus 700 allows a damaged camera to be utilized over a longer life span.

In one or more embodiments, a shielding may be provided around the camera 701 to provide at least some protection for the electronics in the camera 701 against radiation exposure.

In one or more embodiments, the camera 701 may be considered to be a part of the apparatus 700.

It should be noted that the processing unit 710 of the apparatus 700 described herein may be implemented using hardware, software, or a combination of both hardware and software. By means of non-limiting examples, the hardware may include one or more processors, one or more circuit components, or one or more integrated circuits.

Also, it should be noted that the apparatus 700 described herein is not limited to application with medical systems that provide radiation treatment beams, and that the apparatus 700 may be employed in other types of medical system and procedures. For example, in other embodiments, the apparatus 700 may be used with a medical device configured to provide proton beam. As another example, the apparatus 700 may be used with a medical system configured to provide imaging beam for imaging a patient. In some cases, the imaging may be performed using a CT machine, which may be a stationary machine, or a machine that is moveably coupled to a rail. Also, as used in this specification, the term "radiation" may include "proton beam", a beam for treatment, or a beam for imaging.

FIG. 13 illustrates a method 1400 that may be performed by an apparatus. The apparatus may be the apparatus of FIG. 7, 11, or 12. The method 1400 includes: receiving, by a processing unit, an image from a camera, wherein the image is generated by the camera while the camera is viewing at least a part of the patient and/or at least a part of the medical system (item 1402); and replacing, by the processing unit, a damaged-pixel value in the image that corresponds with a damaged pixel in the camera that is damaged due to radiation resulted from an operation of the medical device (item 1404).

In some embodiments, item 1404 may be repeated to replace other damaged-pixel value(s) in the image. Also, in some embodiments, item 1402 may be repeated so that the processing unit receives multiple images from the camera (e.g., images that are part of a video stream). In such cases, item 1404 may be repeated multiple times for replacing multiple damaged-pixel values in each of the images in the video stream.

Optionally, the method 1400 further includes accessing a medium storing a location of the damaged pixel.

Optionally, in the method 1400, the medium comprises a lookup table storing the location of the damaged pixel.

Optionally, in the method 1400, the damaged-pixel value is replaced with a new pixel value.

Optionally, in the method 1400, the new pixel value comprises a median or an average of neighboring pixel values of respective neighboring pixels around the damaged pixel.

Optionally, in the method 1400, the neighboring pixel values comprise four or more neighboring pixel values.

Optionally, in the method 1400, the neighboring pixel values comprise eight or more neighbor pixel values.

Optionally, the method 1400 further includes replacing at least eight neighboring pixel values of respective eight neighboring pixels that are surrounding the damaged pixel.

Optionally, the method 1400 further includes identifying the damaged pixel in the camera.

Optionally, in the method 1400, the damaged pixel in the camera is identified by obtaining a calibration image from the camera, and identifying a pixel value in the calibration image having an intensity that is above a threshold.

Optionally, in the method 1400, a majority of the calibration image is black or dark.

Optionally, in the method 1400, the act of obtaining the calibration image comprises operating the camera to generate the calibration image.

Optionally, in the method 1400, the camera is operated to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

Optionally, in the method 1400, a moving window is applied to sequentially process different combinations of X number of pixels in the image; and wherein for each of the combinations of X number of pixels, a center-pixel value is replaced with a replacement pixel value that is calculated as an average or a median using at least some of the X number of pixels in the window.

Optionally, in the method 1400, the window comprises a N-pixel by N-pixel window, wherein N is any odd integer.

Optionally, the method 1400 further includes receiving an additional image from an additional camera.

Optionally, in the method 1400, the damaged-pixel value in the image from the camera is replaced with a corresponding pixel value in the additional image from the additional camera.

Optionally, in the method 1400, the camera and the additional camera are arranged in a side-by-side configuration with respect to each other.

Optionally, in the method 1400, the processing unit or the apparatus is a part of the camera.

In some embodiments, a processor-readable non-transitory medium having a set of instructions may be provided. The set of instructions may be executed to cause the method 1400 to be performed. In particular, the set of instructions may be executed to cause a processing unit to receive an image from a camera, wherein the image is generated by the camera while the camera is viewing at least a part of the patient and/or at least a part of the medical system. An execution of the instructions may also cause the processing unit to replace a damaged-pixel value in the image that corresponds with a damaged pixel in the camera that is damaged due to radiation resulted from an operation of the medical device.

Specialized Processing System

FIG. 14 is a block diagram illustrating an embodiment of a specialized processing system 1600 that can be used to implement various embodiments described herein. For example, the processing system 1600 may be configured to replace one or more damaged-pixel values in an image with corresponding replacement pixel values in accordance with some embodiments. Also, in some embodiments, the processing system 1600 may be used to implement the apparatus 700 of FIG. 7, 11, or 12. The processing system 1600 may also be an example of any processing unit, e.g., processing unit 710, described herein.

Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk or optical disk, is provided and coupled to the bus 1602 for storing information and instructions.

The processor system 1600 may be coupled via the bus 1602 to a display 167, such as a flat panel, for displaying information to a user. An input device 1614, including alphanumeric and other keys, or a touchscreen, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 167. This input device typically has two degrees of freedom in two axes, a first axis (e.g., x) and a second axis (e.g., y), that allows the device to specify positions in a plane.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk of a remote computer. The remote computer can load the instructions into its dynamic memory and send the instructions over a network, such as the Internet or a local network. A receiving unit local to the processing system 1600 can receive the data from the network, and provide the data on the bus 1602. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be an integrated services digital network (ISDN) card or a modem to provide a data communication connection to a corresponding type of telephone line. As another example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

It should be noted that as used in this specification, the term "damaged pixel" refers to a pixel of a camera that is damaged, wherein the damage may be due to radiation exposure or other factor(s)/condition(s) that is unrelated to radiation exposure.

Also, as used in this specification, the term "neighboring pixel" (e.g., with respect to a certain pixel being considered), or any of other similar terms, such as "adjacent pixel" or "surrounding pixel", refers to a pixel that is directly next to the certain pixel, or that is separated from the certain pixel by one or more other pixel(s) (e.g., separated by 1 pixel, 2 pixels, 3 pixels, etc., but not more than 5 pixels).

In addition, as used in this specification, the term "enter pixel" in an image portion (e.g., a window) refers to any pixel that is not at a side or perimeter of the image portion. For example, a "center pixel" in a 5×5 pixel area may be any of the 9 pixels between the outer rows or columns of pixels of the 5×5 pixel area.

It should be noted that as used in this specification, the term "image" is not limited to an image that is displayed, and may refer to an image that is not displayed (e.g., an image in data or digital form that is stored).

The following items are exemplary features of embodiments described herein. Each item may be an embodiment itself or may be a part of an embodiment. One or more items described below may be combined with other item(s) in an embodiment.

Item 1: An apparatus for use with a medical system, the medical system comprising a medical device configured to treat and/or image a patient, includes: an input configured to receive an image from a camera, the camera configured to view at least a part of the patient and/or at least a part of the medical system; a processing unit configured to replace a damaged-pixel value in the image corresponding with a damaged pixel in the camera that is damaged due to radiation resulted from an operation of the medical device; and an output for outputting an improved image having less noise compared to the image received from the camera.

Item 2: The processing unit is configured to access a medium storing a location of the damaged pixel.

Item 3: The medium comprises a lookup table storing the location of the damaged pixel.

Item 4: The processing unit is configured to replace the damaged-pixel value with a new pixel value.

Item 5: The processing unit is configured to determine the new pixel value by determining a median or an average of neighboring pixel values of respective neighboring pixels around the damaged pixel.

Item 6: The neighboring pixel values comprise four or more neighboring pixel values.

Item 7: The neighboring pixel values comprise eight or more neighbor pixel values.

Item 8: The processing unit is also configured to replace at least eight neighboring pixel values of respective eight neighboring pixels that are surrounding the damaged pixel.

Item 9: The processing unit is configured to identify the damaged pixel in the camera.

Item 10: The processing unit is configured to identify the damaged pixel in the camera by obtaining a calibration image from the camera, and identifying a pixel value in the calibration image having an intensity that is above a threshold.

Item 11: A majority of the calibration image is black or dark.

Item 12: The processing unit is configured to operate the camera to generate the calibration image.

Item 13: The processing unit is configured to operate the camera to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

Item 14: The processing unit is configured to apply a moving window to sequentially process different combinations of X number of pixels in the image; and wherein for each of the combinations of X number of pixels, the processing unit is configured to replace a center-pixel value with a replacement pixel value that is calculated as an average or a median using at least some of the NX number of pixels in the window.

Item 15: The window comprises a N-pixel by N-pixel window, wherein N is any odd integer.

Item 16: The processing unit is configured to receive an additional image from an additional camera.

Item 17: The processing unit is configured to replace the damaged-pixel value in the image from the camera with a corresponding pixel value in the additional image from the additional camera.

Item 18: The apparatus further includes the camera and the additional camera, wherein the camera and the additional camera are arranged in a side-by-side configuration with respect to each other.

Item 19: The processing unit or the apparatus is a part of the camera.

Item 20: A method performed by an apparatus for use with a medical system, the medical system comprising a medical device configured to treat and/or image a patient, includes: receiving, by a processing unit, an image from a camera, wherein the image is generated by the camera while the camera is viewing at least a part of the patient and/or at least a part of the medical system; and replacing, by the processing unit, a damaged-pixel value in the image that corresponds with a damaged pixel in the camera that is damaged due to radiation resulted from an operation of the medical device.

Item 21: The method further includes accessing a medium storing a location of the damaged pixel.

Item 22: The medium comprises a lookup table storing the location of the damaged pixel.

Item 23: The damaged-pixel value is replaced with a new pixel value.

Item 24: The new pixel value comprises a median or an average of neighboring pixel values of respective neighboring pixels around the damaged pixel.

Item 25: The neighboring pixel values comprise four or more neighboring pixel values.

Item 26: The neighboring pixel values comprise eight or more neighbor pixel values.

Item 27: The method further includes replacing at least eight neighboring pixel values of respective eight neighboring pixels that are surrounding the damaged pixel.

Item 28: The method further includes identifying the damaged pixel in the camera.

Item 29: The damaged pixel in the camera is identified by obtaining a calibration image from the camera, and identifying a pixel value in the calibration image having an intensity that is above a threshold.

Item 30: A majority of the calibration image is black or dark.

Item 31: The act of obtaining the calibration image comprises operating the camera to generate the calibration image.

Item 32: The camera is operated to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

Item 33: A moving window is applied to sequentially process different combinations of X number of pixels in the image; and wherein for each of the combinations of X number of pixels, a center-pixel value is replaced with a replacement pixel value that is calculated as an average or a median using at least some of the X number of pixels in the window.

Item 34: The window comprises a N-pixel by N-pixel window, wherein N is any odd integer.

Item 35: The method further includes receiving an additional image from an additional camera.

Item 36: The damaged-pixel value in the image from the camera is replaced with a corresponding pixel value in the additional image from the additional camera.

Item 37: The camera and the additional camera are arranged in a side-by-side configuration with respect to each other.

Item 38: The processing unit or the apparatus is a part of the camera.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

What is claimed:

1. An apparatus for use with a medical system, the medical system comprising a medical device configured to treat and/or image a patient, the apparatus comprising:
    an input configured to receive an image from a camera, the camera configured to view at least a part of the patient and/or at least a part of the medical system, wherein the camera is configured to detect visible light, and wherein the image from the camera is based on the detected visible light;
    a processing unit configured to replace a damaged-pixel value in the image corresponding with a damaged pixel in the camera that is damaged due to radiation resulted from an operation of the medical device; and
    an output for outputting an improved image having less noise compared to the image received from the camera;
    wherein the processing unit is also configured to replace at least eight pixel values of respective at least eight pixels that are next to the damaged pixel.

2. The apparatus of claim 1, wherein the processing unit is configured to access a medium storing a location of the damaged pixel.

3. The apparatus of claim 2, wherein the medium comprises a lookup table storing the location of the damaged pixel.

4. The apparatus of claim 1, wherein the processing unit is configured to replace the damaged-pixel value with a new pixel value.

5. The apparatus of claim 4, wherein the processing unit is configured to determine the new pixel value by determining a median or an average of neighboring pixel values of respective neighboring pixels around the damaged pixel.

6. The apparatus of claim 5, wherein the neighboring pixel values comprise four or more neighboring pixel values.

7. The apparatus of claim 5, wherein the neighboring pixel values comprise eight or more neighbor pixel values.

8. The apparatus of claim 1, wherein the processing unit is configured to identify the damaged pixel in the camera.

9. The apparatus of claim 8, wherein the processing unit is configured to identify the damaged pixel in the camera by obtaining a calibration image from the camera, and identifying a pixel value in the calibration image having an intensity that is above a threshold.

10. The apparatus of claim 9, wherein a majority of the calibration image is black or dark.

11. The apparatus of claim 9, wherein the processing unit is configured to operate the camera to generate the calibration image.

12. The apparatus of claim 11, wherein the processing unit is configured to operate the camera to generate the calibration image when the camera is covered by a lens cap, when the camera is viewing a black or dark area, when the camera is in a low-lighting environment, when an image shutter or a chopper is blocking light into the camera, or when a mechanical blocker outside the camera is positioned to block light into the camera.

13. The apparatus of claim 1, wherein the processing unit is configured to apply a moving window to sequentially process different combinations of X number of pixels in the image; and
wherein for each of the combinations of X number of pixels, the processing unit is configured to replace a center-pixel value with a replacement pixel value that is calculated as an average or a median using at least some of the X number of pixels in the window.

14. The apparatus of claim 13, wherein the window comprises a N-pixel by N-pixel window, wherein N is any odd integer.

15. The apparatus of claim 1, wherein the processing unit is configured to receive an additional image from an additional camera.

16. The apparatus of claim 15, wherein the processing unit is configured to replace the damaged-pixel value in the image from the camera with a corresponding pixel value in the additional image from the additional camera.

17. The apparatus of claim 15, further comprising the camera and the additional camera, wherein the camera and the additional camera are arranged in a side-by-side configuration with respect to each other.

18. The apparatus of claim 1, wherein the processing unit or the apparatus is a part of the camera.

19. An apparatus for use with a medical system, the medical system comprising a medical device configured to treat and/or image a patient, the apparatus comprising:
an input configured to receive an image from a camera, the camera configured to view at least a part of the patient and/or at least a part of the medical system;
a processing unit configured to replace a damaged-pixel value in the image corresponding with a damaged pixel in the camera that is damaged due to radiation resulted from an operation of the medical device; and
an output for outputting an improved image having less noise compared to the image received from the camera;
wherein the processing unit is configured to replace the damaged-pixel value with a new pixel value;
wherein the processing unit is also configured to replace one or more neighboring pixel values of respective one or more neighboring pixels that are next to the damaged pixel; and
wherein the one or more neighboring pixels comprise at least eight neighboring pixels surrounding the damaged pixel.

20. A method performed by an apparatus for use with a medical system, the medical system comprising a medical device configured to treat and/or image a patient, the method comprising:
receiving, by a processing unit, an image from a camera, wherein the image is generated by the camera while the camera is viewing at least a part of the patient and/or at least a part of the medical system, wherein the camera is configured to detect visible light, and wherein the image from the camera is generated based on the detected visible light;
replacing, by the processing unit, a damaged-pixel value in the image that corresponds with a damaged pixel in the camera that is damaged due to radiation resulted from an operation of the medical device; and
replacing at least eight pixel values of respective at least eight pixels that are next to the damaged pixel.

* * * * *